United States Patent
Chion et al.

(10) Patent No.: US 11,046,182 B2
(45) Date of Patent: Jun. 29, 2021

(54) SYSTEM AND METHOD FOR PROVIDING MOMENTUM SCROLLING VIA A ROTARY USER INTERFACE DEVICE

(71) Applicant: NIO USA, Inc., San Jose, CA (US)

(72) Inventors: James A. Chion, San Francisco, CA (US); Timothy J. Meador, Fairfield, CA (US); Pierluigi Dalla Rosa, Oakland, CA (US); Robin Bigio, San Francisco, CA (US)

(73) Assignee: NIO USA, Inc., San Jose, CA (US)

( * ) Notice: Subject to any disclaimer, the term of this patent is extended or adjusted under 35 U.S.C. 154(b) by 220 days.

(21) Appl. No.: 16/167,003

(22) Filed: Oct. 22, 2018

(65) Prior Publication Data
US 2020/0122575 A1 Apr. 23, 2020

(51) Int. Cl.
*B60K 35/00* (2006.01)
*G06F 3/01* (2006.01)
*G06F 3/0485* (2013.01)

(52) U.S. Cl.
CPC ............ *B60K 35/00* (2013.01); *G06F 3/016* (2013.01); *G06F 3/0485* (2013.01); *B60K 2370/126* (2019.05); *B60K 2370/143* (2019.05); *B60K 2370/52* (2019.05)

(58) Field of Classification Search
CPC ............... B60K 35/00; B60K 2370/52; B60K 2370/126; B60K 2370/143; G06F 3/016; G06F 3/0485; G06F 3/03547; G06F 3/0362
See application file for complete search history.

(56) References Cited

U.S. PATENT DOCUMENTS

| | | | |
|---|---|---|---|
| 2,098,410 A | * | 11/1937 | Williams ............... A63F 9/143 463/64 |
| 5,903,229 A | | 5/1999 | Kishi |
| 7,119,789 B1 | | 10/2006 | Shaw et al. |
| 9,009,626 B2 | | 4/2015 | Tsuk et al. |
| 9,142,104 B2 | | 9/2015 | Nakamura et al. |
| 9,330,544 B2 | | 5/2016 | Levesque et al. |

(Continued)

OTHER PUBLICATIONS

Windows 7 Mouse Acceleration Confusion: Ronald.K, created Jan. 5, 2010, available online at https://answers.microsoft.com/en-us/windows/forum/all/windows-7-mouse-acceleration-confusion/f684bb4d-3ba3-4d1d-9de1-d4e41e1da1ba: last accessed Jul. 31, 2020 (Year: 2010).*

(Continued)

*Primary Examiner* — Behrang Badii
*Assistant Examiner* — Daniel L Greene
(74) *Attorney, Agent, or Firm* — Sheridan Ross P.C.

(57) ABSTRACT

The disclosure describes methods and systems for controlling a rotary dial input device. A dial of the rotary dial input device has a specific mass that, in conjunction with a low-friction rotational bearing system, provides a momentum scrolling effect when physically spun and released. Upon spinning the dial freely, without subsequent user contact, the mass and velocity of the rotating dial provides momentum that causes the dial to continue to rotate for one or more revolutions. During this rotation a corresponding effect is provided, or dynamically rendered, to a user interface display device. Such an effect scrolls a list of objects displayed at the same, or a substantially similar, rate of speed to that of the dial rotating under momentum.

20 Claims, 14 Drawing Sheets

(56) References Cited

U.S. PATENT DOCUMENTS

| | | | |
|---|---|---|---|
| 2002/0044134 A1* | 4/2002 | Ericson | G06F 3/0317 345/163 |
| 2005/0172230 A1* | 8/2005 | Burk | B60K 35/00 715/716 |
| 2006/0274033 A1* | 12/2006 | Ruettiger | H01H 19/11 345/156 |
| 2006/0280575 A1* | 12/2006 | Ruettiger | B60K 37/06 411/15 |
| 2008/0223703 A1 | 9/2008 | Schelbert et al. | |
| 2008/0238879 A1 | 10/2008 | Jaeger et al. | |
| 2010/0031186 A1 | 2/2010 | Tseng et al. | |
| 2011/0124415 A1* | 5/2011 | Shimono | A63F 13/85 463/42 |
| 2013/0220779 A1 | 8/2013 | Kerner et al. | |
| 2013/0274997 A1* | 10/2013 | Chien | H04M 1/72577 701/36 |
| 2015/0159904 A1 | 6/2015 | Barton | |
| 2015/0193023 A1* | 7/2015 | Odgers | G06F 3/017 345/163 |
| 2016/0004367 A1* | 1/2016 | Shimada | B60K 37/02 345/174 |
| 2016/0020045 A1 | 1/2016 | McAllister | |
| 2016/0306349 A1* | 10/2016 | Lau | G05D 1/0016 |
| 2019/0012003 A1 | 1/2019 | Grant et al. | |
| 2020/0130908 A1* | 4/2020 | Ponticelli, Sr. | B65D 53/02 |

OTHER PUBLICATIONS

Notice of Allowance for U.S. Appl. No. 16/166,997, dated Feb. 3, 2020 7 pages.
Supplemental Notice of Allowance for U.S. Appl. No. 16/166,997, dated Mar. 30, 2020 5 pages.
U.S. Appl. No. 16/166,997, filed Oct. 22, 2018, Chion et al.
Official Action for U.S. Appl. No. 16/166,997, dated Jul. 25, 2019 14 pages.

* cited by examiner

SYSTEM AND METHOD FOR PROVIDING MOMENTUM SCROLLING VIA A ROTARY USER INTERFACE DEVICE

FIELD

The present disclosure is generally directed to user interface devices, in particular, toward multiple-input user interface devices for vehicles.

BACKGROUND

Navigating complex user interfaces in a computing environment typically requires a combination of several different input devices that are each configured to provide a specific type of output. While a keyboard can be used to enter text or other characters, a mouse, stylus, or touchscreen input may be required to point a cursor and/or select an interface element rendered by a display device. These traditional interface devices, however, may not be feasible to use when interacting with the complex computing interfaces and display devices associated with a vehicle.

Among other things, the safe operation of a vehicle demands focus and attention that would not generally allow a user to interact with keyboards or other traditional input devices to interact with vehicle control systems and displays. Further, the operator of a vehicle may not be able to manipulate input devices that require more than one hand to use while the operator is driving the vehicle. In addition, the configuration and the limited amount of the space inside of vehicles generally cannot support multiple traditional input devices.

DETAILED DESCRIPTION

Figure 1:
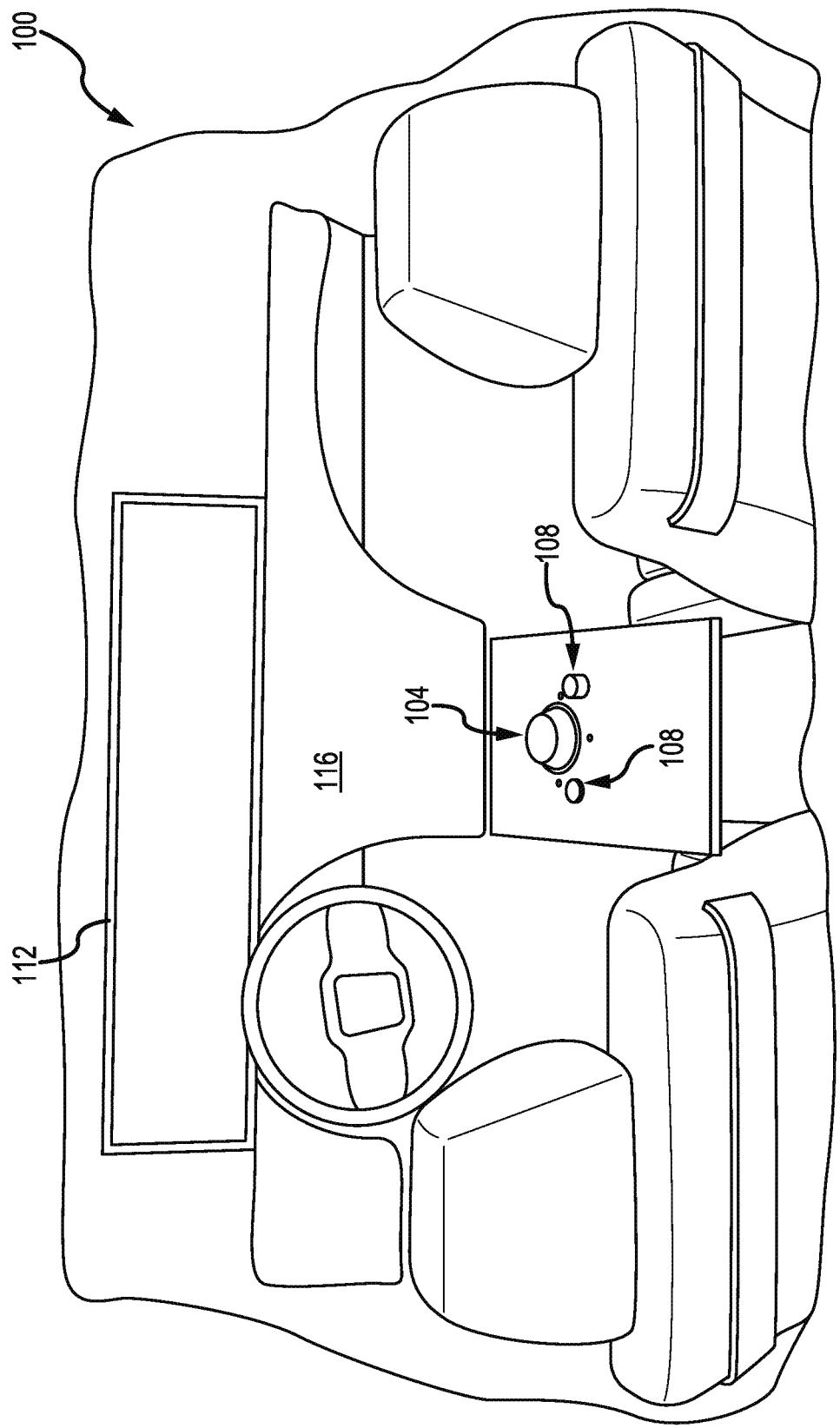
FIG. 1 shows a perspective view of a user interface environment in accordance with embodiments of the present disclosure.

In some embodiments, the present disclosure describes a mechanical device that, among other things, provides a simplified input system for navigating a multitude of complex user interfaces in an efficient and simple manner. The device may be a user input device for a vehicle configured with a moveable dial, or jog dial. The jog dial may be configured to rotate freely about an axis and at least partially move in a linear direction along a length of the axis.

In some cases, the jog dial user interface device may include a touch-based, touch sensitive interface, or touchpad, disposed within a center of the jog dial (e.g., surrounded by the dial). In one embodiment, the touchpad may be rotationally fixed, but may be configured to move in the linear direction along the rotational axis along with or independently of the dial. Some embodiments may not require this touchpad. However, the touchpad may allow for multi-touch input provided by a user. The touchpad may be covered by a touchpad cover and may be placed on top of a trackpad holder. In one embodiment, the touchpad may be affixed, or otherwise attached, to a rotationally fixed shaft of the jog dial user interface device.

In any event, the jog dial may comprise a rotational dial operatively connected to the rotationally fixed shaft via one or more low-friction (e.g., ABEC-type) ball bearings. The user input device, or jog dial user interface device, may include at least one linear bearing and spring surrounding the rotational axis and defining a selection input line of travel (e.g., along a length of the rotational axis). The jog dial and/or the touchpad may be actuated, or depressed, in a direction along this input line of travel to provide a selection input to the jog dial user interface device, or other computing system, of a vehicle. For example, actuating the jog dial and/or the touchpad may contact a button or switch configured to provide a selection input.

In some embodiments, the jog dial user interface device may provide unrestricted rotation of the jog dial (e.g., allowing rotation that is not limited or restricted by actual/physical detents, contacts, brakes, etc.) with various movement feedback provided via one or more haptic devices (e.g., piezoelectric devices, eccentric rotating mass actuators, linear resonant actuators, and/or the like) included and/or attached to a portion of the jog dial user interface device (e.g., the jog dial, shaft, etc.). In some cases, the haptic feedback may be accompanied by an auditory output (e.g., click, buzz, ping, etc., and/or some other sound or combination thereof). In one embodiment, the haptic feedback may provide the auditory output. In some embodiments, the auditory output may be provided via a speaker or other sound transducer associated with the jog dial user interface device. This unrestricted movement allows the jog dial to spin freely under its own mass, with feedback provided by various contextually-sensitive, configurable, haptic interactions. The mass of the jog dial and free movement provides a luxury feel otherwise not available in conventional user interface devices.

In some embodiments, the jog dial may have a specific mass that, in conjunction with a low-friction rotational bearing system, provides a momentum scrolling effect when physically spun and released. In particular, once spun, the jog dial may continue to spin freely for one or more revolutions and a corresponding effect may be provided (e.g., dynamically rendered, etc.) on a user interface display device.

In some embodiments, the physical properties (e.g., mass and low friction, etc.) may allow the dial to be quickly spun in order to enable a rapid scrolling through displayed lists, sets, or groups of options. Because of the physical mass of the dial and low rotating resistance of the rotational bearings the dial may be capable of rotating freely when spun (and released).

The software and processing system of the jog dial user interface device may interpret the movement characteristics of the jog dial after an imparted spin, determine an angular speed, acceleration, deceleration, and/or other variations in speed/acceleration/deceleration over time and mimic the movement characteristics in the display of object or items, selection focus, or other indicators on the interface display device. The relationship between the jog dial's movement properties may provide different visual effects based on a context of the displayed elements and/or other software elements. For example, the software may be responsive to how quickly a jog dial is scrolling (e.g., rotating under the frictionless bearing arrangement, etc.) and may indicate the rotational speed of the jog dial by speeding up the scrolling through a list, group of options, or menu, etc.

In some embodiments, the rotational movement of the jog dial may be altered based on an energy provided by a piezo/haptic device attached to the rotationally fixed shaft and/or jog dial of the jog dial user interface device. However, embodiments of the present disclosure are not so limited.

With the jog dial user interface device configuration described herein it is possible to simulate acceleration and momentum based on a software simulation of physical movements. Accordingly, physically accurate movements in an associated user interface are provided making the interaction a more pleasing experience. Lists and menus may benefit the most from the presently disclosed momentum scrolling. In one embodiment, to make momentum scrolling efficient the resolution of the virtual detents may be variable and change accordingly with a list and/or menu length. If the list and/or menu is long the virtual detents may be provided closer together (angularly). If the list and/or menu is short the virtual detents may be reconfigured to be further apart (angularly). As can be appreciated, in this embodiment, the various haptics and/or auditory feedback of the jog dial may change accordingly.

In some embodiments, the jog dial user interface device may include a jog dial, a high-precision rotary encoder, and a haptic device configured to provide haptic feedback when the jog dial is rotated from one angular position to another. In some cases, the haptic feedback may be provided based on a user interface context, speed of rotation, and/or a position of the jog dial along 360 degrees. In one embodiment, the haptic feedback may be provided when the jog dial is rotated to a computer-determined, virtual, detent position.

The variable virtual detents as described herein may be predefined and/or based on positional information associated with a user interface menu, list, set, group of options, etc. For instance, the virtual detents may be variable (e.g., dynamically applied, released, and/or moved) depending on an application, user interface presentation, and/or interaction with some other controlled system. The jog dial may be capable of providing 200 detents, or steps, per revolution (i.e., complete rotation of the jog dial). This resolution may be achieved via a rotary encoder reading a rotation of the dial (e.g., via a rotary encoder disk or wheel, etc.). In one embodiment, the rotary encoder may comprise an optical sensor reading a rotary scale associated with a code wheel.

The software and processing system for the jog dial user interface device may be configured to be highly responsive, given the high degree of sensitivity associated with the rotary input. The software may be designed to read each of the rotary steps as distinct inputs for switching between different user interface items or to create peaking animations between different items in the user interface.

In some embodiments, the software and processing system may determine how quickly the jog dial has been moved (e.g., reading a specific number of rotary steps over a time period) and the angular speed may correspond to a speed of scrolling through lists, sets, groups of options, and/or menus. In one embodiment, the virtual detents provided by the haptic device may cause a movement of a spun dial to be restricted (e.g., interrupting an energy of the jog dial spinning by vibrating the shaft upon which the jog dial spins).

Although the encoder may be illustrated and described as being disposed within a portion of the jog dial, it should be appreciated that the encoder may be disposed outside of the jog dial envelope and, as such, the electronics associated with the encoder would not require routing through the rotationally fixed shaft.

In some embodiments, the haptic device of the jog dial user interface device may be configured to apply haptic feedback when the jog dial is rotated between options in a user interface presentation and cease haptic feedback when a selection focus reaches a user interface limit allowing the dial to spin freely (e.g., without additionally applied resistance). While the haptic feedback at one or more points of rotation can provide a virtual detent effect by essentially transmitting energy (e.g., in the form of movement, vibration, etc.) to the jog dial as it is rotated, the present disclosure describes a user interaction where the haptic feedback and/or outside resistance is eliminated allowing the dial to spin freely. In some cases, the cessation of haptic feedback may be accompanied by a break in auditory output (e.g., providing a silence), or a sound that indicates the dial has reached the user interface limit (e.g., whistling, etc.).

By way of example, upon reaching the end of a list, menu, or group of options, in a displayed user interface, the haptic feedback provided by the haptic device(s) of the jog dial user interface device may be eliminated or ceased. This cessation has the effect of providing a recognizable difference to a user (e.g., indicating that the end of the list has been reached, etc.) from the virtual detents provided when moving between items in a list.

In one embodiment, upon rotating the jog dial such that the selection focus returns to items in the list, group of options, or menu, the virtual detents provided by the haptic device may be returned causing the movement of the jog dial to have definitive angular steps between options. This feedback may provide a restricted feel to the movement of the dial, without physically interrupting the movement of the dial (e.g., by interrupting an energy of the dial spinning by vibrating the shaft upon which the dial spins).

Embodiments of the present disclosure will be described in connection with a computing system and/or display devices of a vehicle, and in some embodiments, an electric vehicle, rechargeable electric vehicle, and/or hybrid-electric vehicle and associated systems. It should be appreciated, however, that the jog dial user interface device is not limited to use with a vehicle and may be used with any computing environment and/or display device.

FIG. 1 shows a perspective view of a user interface environment 100 in accordance with embodiments of the present disclosure. The user interface environment 100 may include a jog dial user interface device 104, at least one display device 112, and/or physical interface hardware buttons 108. In some embodiments, the display device 112 may be separated by one or more physical or virtual dividers, sections, areas, and/or zones of display. The display device 112 may be configured to render visible objects (e.g., icons, lists, images, moving images, videos, interactive presentations, etc.) via a display (e.g., by selectively providing power and/or communications signals to pixels and/or other display elements of the display device, etc.). The user interface environment 100 may be associated with an interior of a vehicle, however, it should be appreciated embodiments of the present disclosure are not so limited. In the case of a vehicle interior, the jog dial user interface device 104 may be mounted to, or at least partially within, a portion of the vehicle such as an arm rest, center console or dash panel 116, seat, steering wheel, or other surface inside the vehicle interior. As illustrated in FIG. 1, the jog dial user interface device 104 is mounted to a base panel of a center console or arm rest.

Figure 2:
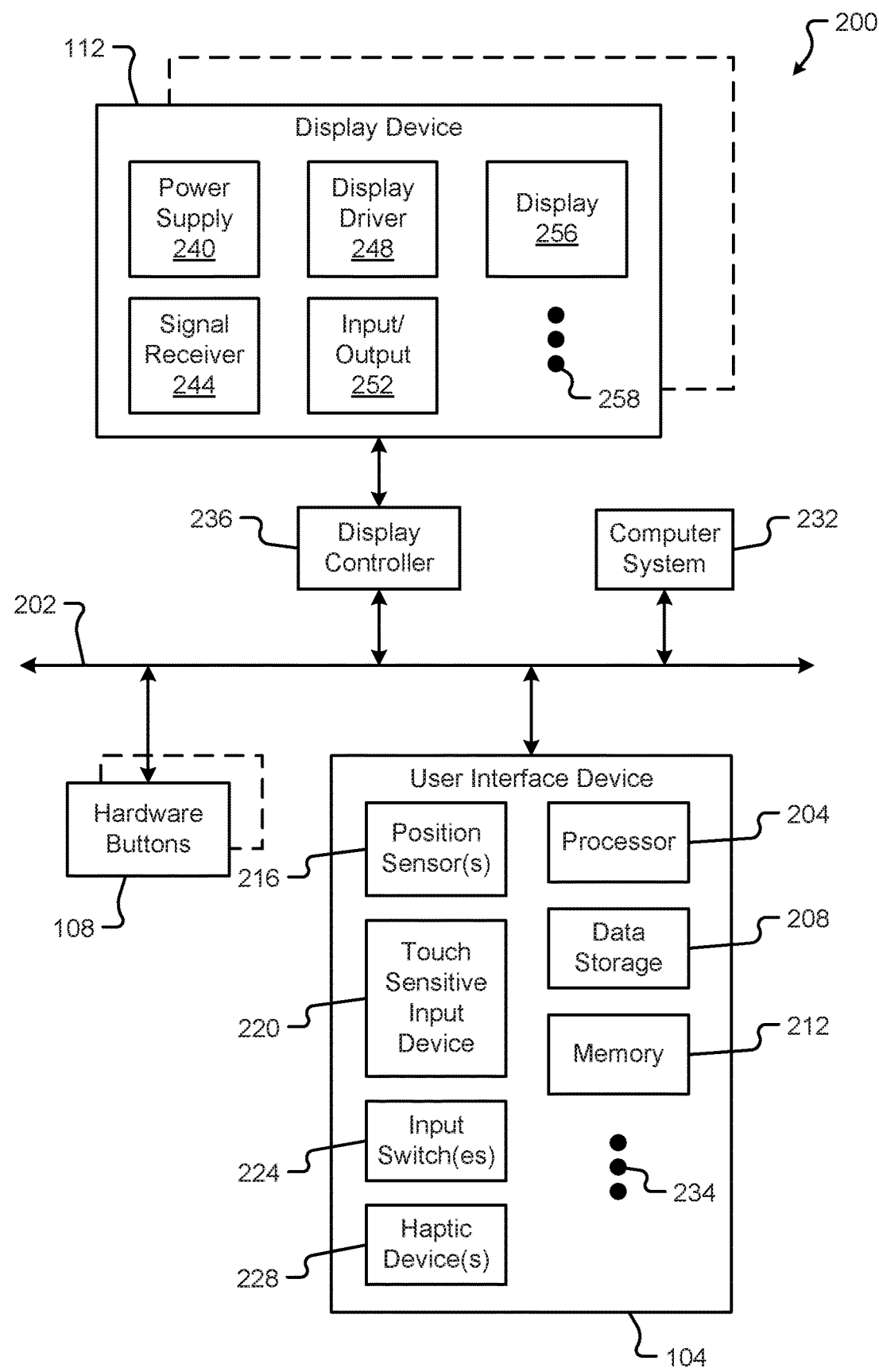
FIG. 2 is a block diagram of the hardware of a user interface system in accordance with embodiments of the present disclosure.

FIG. 2 is a block diagram of the hardware of a user interface system 200 in accordance with embodiments of the present disclosure. As described above, the user interface system 200 may include one or more display devices 112 that are configured to selectively activate pixels and/or display elements to render one or more user interface windows, indicators, icons, characters, etc. In one embodiment, the display device 112 may be a liquid crystal display (LCD), a light-emitting diode (LED) display, electroluminescent display (ELD), organic LED (OLED) display, and/or some other two-dimensional and/or three-dimensional display device. In some embodiments, the display device 112 may extends along a length of a vehicle console or dash. The display device 112 may be configured to render information in one or more discrete areas of the display 256. In any event, the display device 112 may include a power supply 240, a signal receiver 244, a display driver 248, at least one input/output port 252, a display 256, and/or more 258.

One or more display controllers 236 may be included for controlling the operation of the display device 112, including input (e.g., user interface device input) and output (display) functions. In some embodiments, the functions of the display controller 236 may be incorporated into other components, such as a processor or computer system 232.

The computer system 232 may include a processor or controller for executing application programming and/or instructions. In accordance with at least some embodiments of the present disclosure, the computer system 232 may include multiple processor cores, and/or implement multiple virtual processors. In one embodiment, the computer system 232 may include multiple physical processors. For instance, the computer system 232 may comprise a specially configured application specific integrated circuit (ASIC) or other integrated circuit, a digital signal processor, a controller, a hardwired electronic or logic circuit, a programmable logic device or gate array, a special purpose computer, and/or the like. The computer system 232 may function to run programming code or instructions implementing various functions of the user interface system 200.

One or more hardware buttons 108 may be associated with the user interface system 200 and/or the jog dial user interface device 104. The hardware buttons 108 may be configured as switches, buttons, dials, touchpads (e.g., capacitive and/or resistive touch-sensitive pads), and/or some other control device for use in connection with certain control operations of the computer system 232 and/or the jog dial user interface device 104.

Communications between various components of the user interface system 200 may be carried by one or more buses 202. In some embodiments, power may be supplied to the components of the user interface system 200 from a power source and/or power control module. The power control module may include, but is in no way limited to, a battery, an AC-to-DC converter, power control logic, and/or ports for interconnecting the jog dial user interface device 104, the display device 112, and/or other components of the user interface system 200 to a source of power.

The jog dial user interface device 104 may include one or more processors 204, data storage 208, memory 212, position sensor(s) 216, touch sensitive input device 220, input switch(es) 224, haptic device(s) 228, and/or other components 232. As described herein, input provided by the jog dial user interface device 104 may be communicated to the computer system 232 and/or the display device 112 via one or more bus 202.

The processor 204 may comprise a programmable processor or controller for executing application programming or instructions associated with the jog dial user interface device 104. In some embodiments, the processor 204 may include multiple processor cores, and/or implement multiple virtual processors. In one embodiment, the processor 204 may include multiple physical processors. For instance, the processor 204 may comprise a specially configured application specific integrated circuit (ASIC) or other integrated circuit, a digital signal processor, a controller, a hardwired electronic or logic circuit, a programmable logic device or gate array, a special purpose computer, or the like. In any event, the processor 204 may function to run programming code or instructions implementing various functions of the jog dial user interface device 104 and/or the user interface system 200.

The jog dial user interface device 104 may also include a data storage 208 and/or memory 212 for use in connection with the execution of application programming or instructions by the processor 204, and/or for the temporary or long term storage of program instructions and/or data. By way of example, the data storage 208 and/or the memory 212 may comprise RAM, DRAM, SDRAM, or other solid state memory device. In one embodiment, the data storage 208 may comprise a hard disk drive or other random access memory that is separate from the memory 212.

In some embodiments, the jog dial user interface device 104 may include one or more position sensor(s) 216. The position sensor(s) 216 may provide a signal indicating a position of a code wheel, encoder plate, and/or rotary dial of the jog dial user interface device 104. In one embodiment, this signal and position information can be provided as an input, for example to a user interface application running via the processor 204 and/or the computer system 232, to determine an application operating mode, an output for display by the display device 112 (e.g., a position of a user interface element, indicator, pointer, etc., rendered by the display 256 of the display device 112), a speed or other characteristic of the output for display by the display device 112, and/or other jog dial user interface device 104 operations. The position sensor(s) 216 may include one or more of a multiple position switch, an optical switch, an optical sensor (e.g., encoder, etc.), a magnetic sensor, a magnetic switch, a potentiometer, and/or other device capable of providing a signal indicating a number of multiple relative positions of the rotary dial from a rotational origin or reference point.

The jog dial user interface device 104 may include at least one touch sensitive input device 220. In some embodiments, the touch sensitive input device 220 may be disposed inside a rotary dial and may be rotationally fixed (e.g., relative to the rotary dial etc.). The touch sensitive input device 220 may include a physical structure, or a touchpad substrate, that enables the user to interact with the computer system 232 by touching areas on the touchpad and provide information to a user through the display device 112. The touch sensitive input device 220 may sense user contact in a number of different ways, such as by a change in an electrical parameter (e.g., resistance or capacitance), acoustic wave variations, infrared radiation proximity detection, light variation detection, and/or the like. In a resistive touchpad, for example, normally separated conductive and resistive metallic layers in the substrate pass an electrical current. When a user touches the touchpad, the two layers may make contact in the contacted location, whereby a change in electrical field is noted and the coordinates of the contacted location is calculated. In a capacitive touchpad, a capacitive layer may store electrical charge, which is then discharged to the user upon contact with the touchpad, causing a decrease in the charge of the capacitive layer. The decrease may be measured (e.g., via the processor 204, etc.), and the contacted location coordinates determined. In a surface acoustic wave touchpad, an acoustic wave is transmitted through the touchpad, and the acoustic wave may be disturbed by user contact/interaction. A receiving transducer can detect this user contact/interaction instance and then determine the contacted location coordinates associated with the contact/interaction.

Similar to the hardware buttons 108, the jog dial user interface device 104 may include one or more integrated input switch(es) 224. These input switch(es) 224 may receive an actuation or selection input provided by a user at the one or more components of the jog dial user interface device 104. In one embodiment, a user may press and physically displace (e.g., some distance) the rotary dial and/or touchpad along a common selection axis (e.g., the axis of rotation for the rotary dial, etc.) to provide a selection input. This input may be received via a switch, button, optical sensor, or other device that is operatively coupled with the rotary dial and/or touchpad. In some embodiments, the rotary dial may be physically actuated separately and apart from physically actuating the touchpad, and/or vice versa. In this instance, separate input switch(es) 224 may be associated with each of the rotary dial and the touchpad (e.g., providing unique selection input for each device component).

In some embodiments, the jog dial user interface device 104 may include one or more haptic device(s) 228. Haptic devices 228 can include any device that is configured to convert an electrical signal into a mechanical movement or physical feedback to a user of the jog dial user interface device 104. Examples of the haptic device(s) 228 may include, but are in no way limited to, vibrating motors, tactile transducers, eccentric movement motors, magnetically-actuated vibration devices, solenoids, vibrating motor disks, coin-cell vibration motors, piezoelectric transducers, surface transducers, and/or the like. As described herein, the haptic device(s) 228 may be configured to provide feedback to a user of a position of the rotary dial, a selection, a display output, a speed of output, and/or the like. In some embodiments, the feedback may be accompanied by an audible output (e.g., a sound, tone, click, etc.) provided by the haptic device(s) 228. In one embodiment, the haptic device(s) 228 may operate in conjunction with a speaker and/or an amplifier that provides the audible output. The haptic device(s) 228 may be attached to the touch sensitive input device 220, or touchpad, touchpad support member, the center shaft, the jog dial, or other surface of the jog dial user interface device 104.

Figure 3:
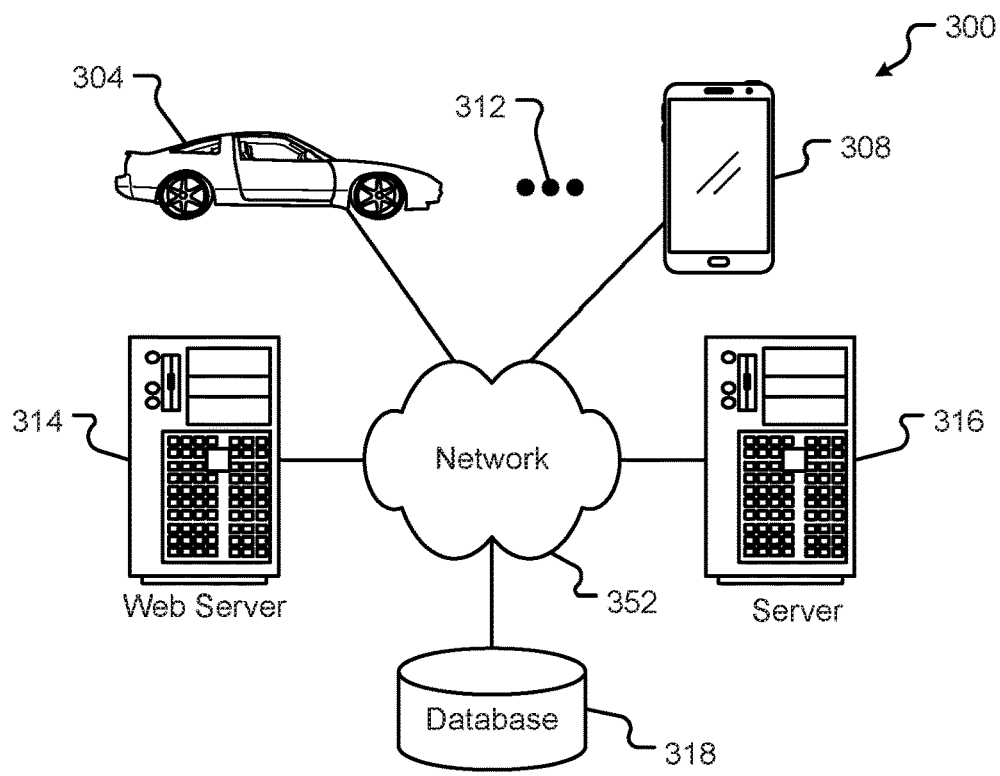
FIG. 3 is a block diagram of a computing environment associated with the embodiments presented herein.

FIG. 3 illustrates a block diagram of a computing environment 300 that may function as the servers, user computers, computer system 232, or other systems provided and described herein. The computing environment 300 includes one or more user computers, or computing devices, such as a vehicle computing device 304, a communication device 308, and/or more 312. The computing devices 304, 308, 312 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 304, 308, 312 may also have any of a variety of applications, including for example, database client and/or server applications, and web browser applications. Alternatively, the computing devices 304, 308, 312 may be any other electronic device, such as a thin-client computer, Internet-enabled mobile telephone, and/or personal digital assistant, capable of communicating via a network 352 and/or displaying and navigating web pages or other types of electronic documents. Although the exemplary computing environment 300 is shown with two computing devices, any number of user computers or computing devices may be supported.

The computing environment 300 may also include one or more servers 314, 316. In this example, server 314 is shown as a web server and server 316 is shown as an application server. The web server 314, which may be used to process requests for web pages or other electronic documents from computing devices 304, 308, 312. The web server 314 can be running an operating system including any of those discussed above, as well as any commercially-available server operating systems. The web server 314 can also run a variety of server applications, including SIP (Session Initiation Protocol) servers, HTTP(s) servers, FTP servers, CGI servers, database servers, Java servers, and the like. In some instances, the web server 314 may publish operations available operations as one or more web services.

The computing environment 300 may also include one or more file and or/application servers 316, which can, in addition to an operating system, include one or more applications accessible by a client running on one or more of the computing devices 304, 308, 312. The server(s) 314 and/or 316 may be one or more general purpose computers capable of executing programs or scripts in response to the computing devices 304, 308, 312. As one example, the server 314, 316 may execute one or more web applications. The web application may be implemented as one or more scripts or programs written in any programming language, such as Java™, C, C#®, or C++, and/or any scripting language, such as Perl, Python, or TCL, as well as combinations of any programming/scripting languages. The application server(s) 316 may also include database servers, including without limitation those commercially available from Oracle®, Microsoft®, Sybase®, IBM® and the like, which can process requests from database clients running on a computing device 304, 308, 312.

The web pages created by the server 314 and/or 316 may be forwarded to a computing device 304, 308, 312 via a web (file) server 314, 316. Similarly, the web server 314 may be able to receive web page requests, web services invocations, and/or input data from a computing device 304, 308, 312 (e.g., a user computer, etc.) and can forward the web page requests and/or input data to the web (application) server 316. In further embodiments, the server 316 may function as a file server. Although for ease of description, FIG. 3 illustrates a separate web server 314 and file/application server 316, those skilled in the art will recognize that the functions described with respect to servers 314, 316 may be performed by a single server and/or a plurality of specialized servers, depending on implementation-specific needs and parameters. The computer systems 304, 308, 312, web (file) server 314 and/or web (application) server 316 may function as the system, devices, or components described in FIGS. 1-3.

The computing environment 300 may also include a database 318. The database 318 may reside in a variety of locations. By way of example, database 318 may reside on a storage medium local to (and/or resident in) one or more of the computers 304, 308, 312, 314, 316. Alternatively, it may be remote from any or all of the computers 304, 308, 312, 314, 316, and in communication (e.g., via the network 352) with one or more of these. The database 318 may reside in a storage-area network ("SAN") familiar to those skilled in the art. Similarly, any necessary files for performing the functions attributed to the computers 304, 308, 312, 314, 316 may be stored locally on the respective computer and/or remotely, as appropriate. The database 318 may be a relational database, such as Oracle 20i®, that is adapted to store, update, and retrieve data in response to SQL-formatted commands.

Figure 4:
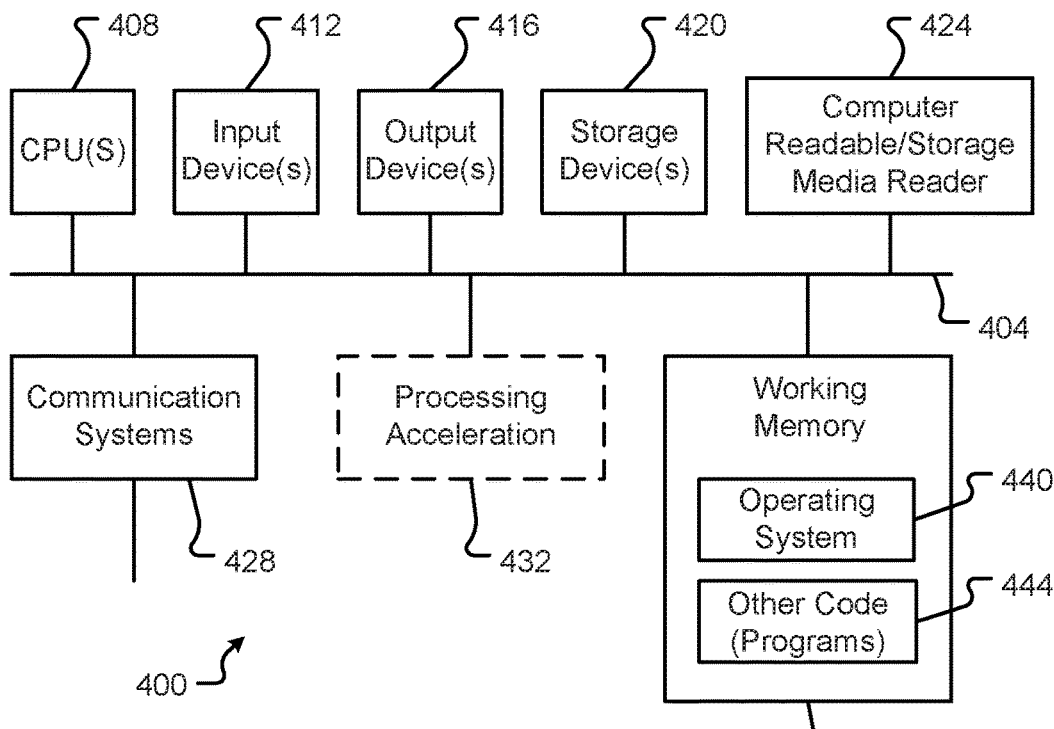
FIG. 4 is a block diagram of a computing device associated with one or more components described herein.

FIG. 4 illustrates one embodiment of a computer system 400 upon which the servers, user computers, computing devices, computer system 232, or other systems or components described above may be deployed or executed. The computer system 400 is shown comprising hardware elements that may be electrically coupled via a bus 404. The hardware elements may include one or more central processing units (CPUs) 408; one or more input devices 412 (e.g., a mouse, a keyboard, etc.); and one or more output devices 416 (e.g., a display device, a printer, etc.). The computer system 400 may also include one or more storage devices 420. By way of example, storage device(s) 420 may be disk drives, optical storage devices, solid-state storage devices such as a random access memory ("RAM") and/or a read-only memory ("ROM"), which can be programmable, flash-updateable and/or the like.

The computer system 400 may additionally include a computer-readable storage media reader 424, a communications system 428 (e.g., a modem, a network card (wireless or wired), an infra-red communication device, etc.), and working memory 436, which may include RAM and ROM devices as described above. The computer system 400 may also include a processing acceleration unit 432, which can include a DSP, a special-purpose processor, and/or the like.

The computer-readable storage media reader 424 can further be connected to a computer-readable storage medium, together (and, optionally, in combination with storage device(s) 420) comprehensively representing remote, local, fixed, and/or removable storage devices plus storage media for temporarily and/or more permanently containing computer-readable information. The communications system 428 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 400 may also comprise software elements, shown as being currently located within a working memory 436, including an operating system 440 and/or other code 444. It should be appreciated that alternate embodiments of a computer system 400 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 204, 408 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 5A:
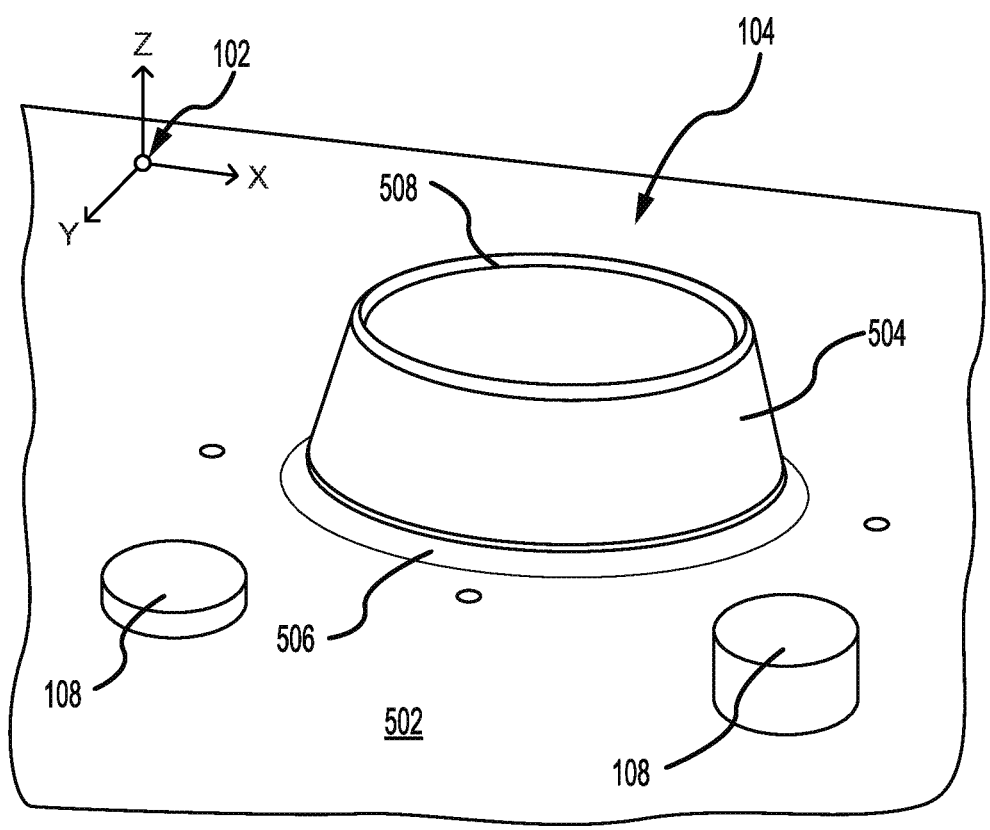
FIG. 5A shows a perspective view of a jog dial user interface device in accordance with embodiments of the present disclosure.
Figure 5B:
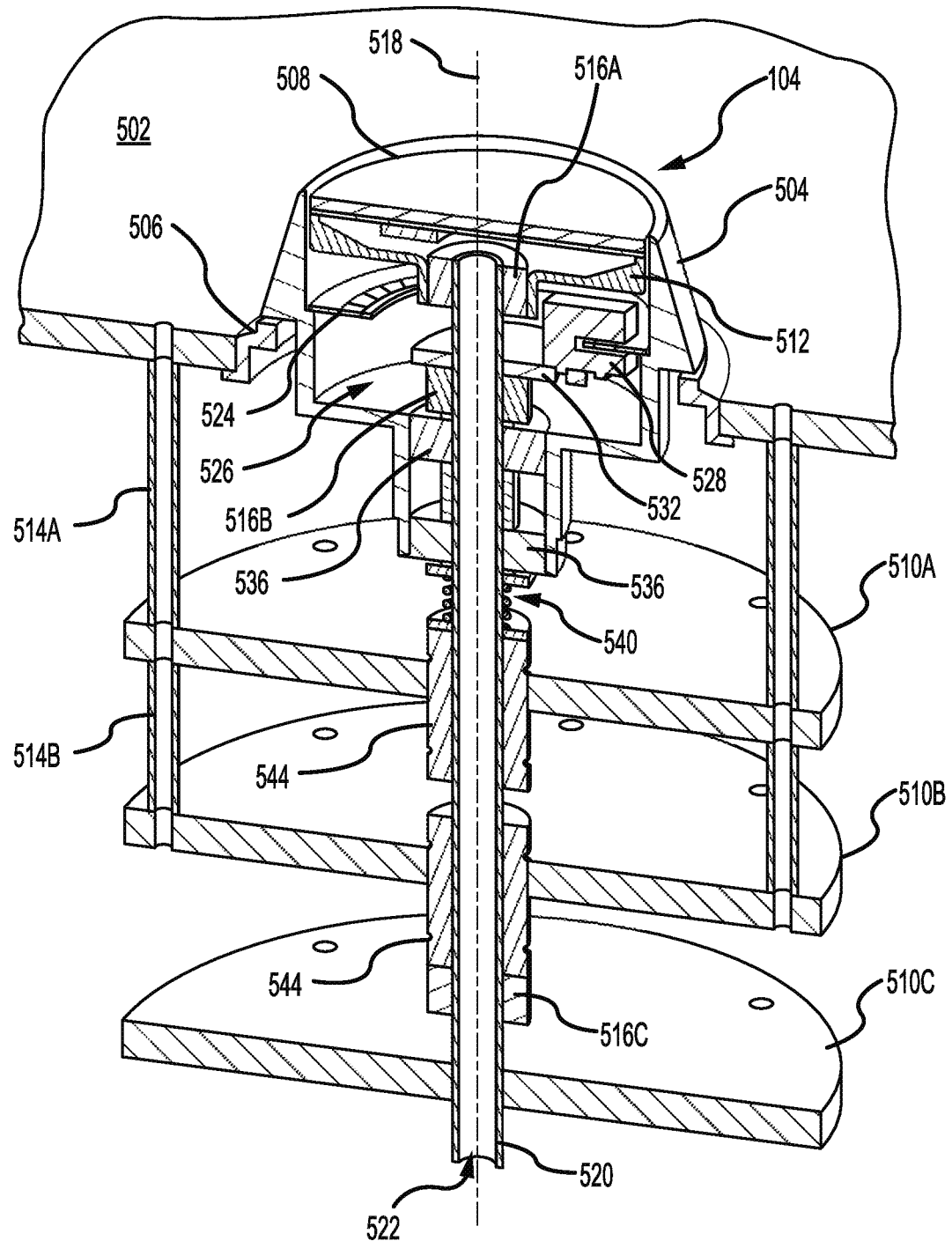
FIG. 5B shows a perspective section view of the jog dial user interface device taken through an approximate center of the device shown in FIG. 5A.
Figure 5C:
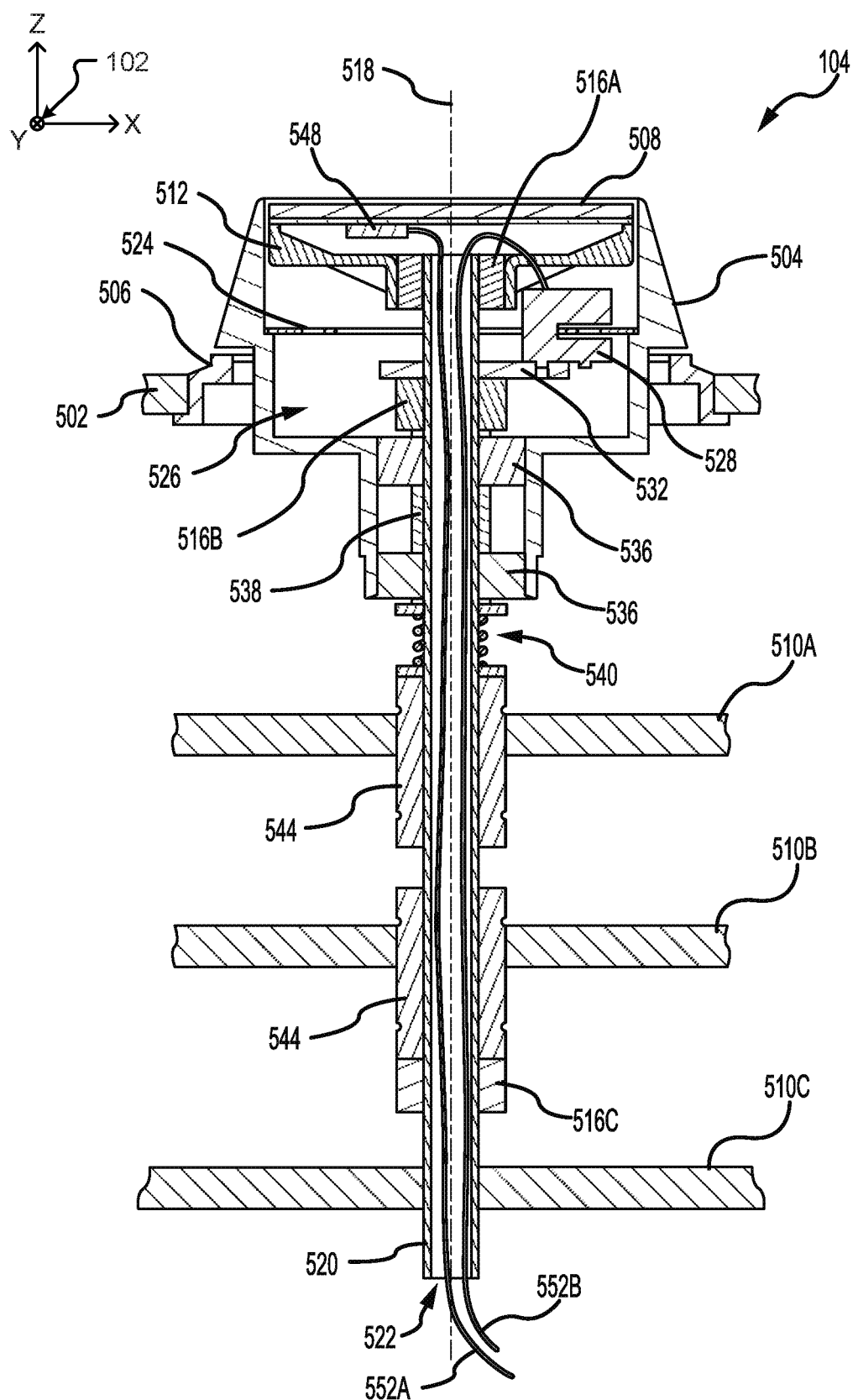
FIG. 5C shows a detail section view of the jog dial user interface device taken through an approximate center of the device shown in FIG. 5A.

Referring now to FIGS. 5A-5C, various views of the jog dial user interface device 104 are shown in accordance with embodiments of the present disclosure. FIG. 5A shows a perspective view of the jog dial user interface device 104 and FIG. 5B shows a perspective section view of the jog dial user interface device 104 taken through an approximate center of the device 104 shown in FIG. 5A. FIG. 5C shows a detail section view of the jog dial user interface device taken through an approximate center of the device shown in FIG. 5A. Features of the jog dial user interface device 104 and relationships of components making up the jog dial user interface device 104 may be described in conjunction with the coordinate system 102.

The jog dial user interface device 104 includes a jog dial 504 having an internal cavity 526 configured to at least partially surround a touchpad 508. In some embodiments, the jog dial 504 may include a substantially symmetrical shape about an axis of rotation, or center axis 518. The jog dial 504 may include a ring-shaped user interface contact surface that is exposed above the base panel 502 of a corresponding mount surface. A panel ring 506 may be disposed between the base panel 502 and the jog dial 504. In some embodiments, the panel ring 506 may be compliant and may serve to close a gap between the base panel 502 and the jog dial 504. While the jog dial 504 rotates about the center axis 518, the jog dial 504 may be offset from, and not in contact with, the panel ring 506. As described herein, the jog dial 504 may be actuated, or clicked, in an axial direction to provide a particular type of input (e.g., a selection input, etc.). During this operation, the jog dial 504 may contact, and even slightly compress, a portion of the panel ring 506.

The touchpad 508 may be any substantially flat computer pointing device (e.g., trackpad, touch-sensitive interface, etc.) that translates a touch or gesture movement into a corresponding input for a computer system 232 and a control of a display device 112. The touchpad 508 may be a capacitive trackpad, such as the ProxSense® proximity and touch series of gesture and input trackpads manufactured by Azoteq. In some embodiments, the touchpad 508 may be configured as a round, or substantially circular, flat substrate that is disposed at least partially in the internal cavity 526 of the jog dial 504. For instance, the touchpad 508 may be similar, if not identical, to the TPR model 54 mm round gesture trackpad (e.g., TPR54-P101, etc.) manufactured by Azoteq. In addition, the touchpad 508 may include a controller, such as the IQS572 series of projected capacitive touch and proximity trackpad/touchscreen controllers manufactured by Azoteq. Embodiments of the jog dial user interface device 104 may arrange the touchpad 508 to be flush with the top of the jog dial 504, slightly offset from the top of the jog dial 504 and disposed inside the internal cavity 526, or slightly offset from the top of the jog dial 504 and disposed at least partially outside of the internal cavity 526. In any event, the jog dial 504 may move independently of the touchpad 508.

The jog dial 504 may be configured to rotate about the center axis 518 and a center shaft 520. The center shaft 520 may be rotationally fixed and axially supported by one or more linear bearings 544 disposed in a subpanel 510A, 510B, fascia, or structural support of the vehicle. For instance, the center shaft 520 may be allowed to move in a direction along the center axis 518 but may be restricted from rotating about the center axis 518. In some embodiments, rotationally fixing the center shaft 520 may include keying at least a portion of the center shaft 520 to a subpanel (e.g., third subpanel 510C), intermediate component, bushing, or other mounting surface. Examples of keying may include, but are in no way limited to, a splined-shaft inside a splined-collar or aperture, a key affixed to the center shaft 520 and disposed at least partially within a fixed keyway or slot, a keyway arranged in the center shaft 520 and a key disposed at least partially inside the keyway and between the shaft 520 and a fixed panel or surface, etc., and/or combinations thereof. In any event, the keying features of the shaft and the fixed panel/surface may allow axial movement of the center shaft 520 without rotation of the shaft 520.

As illustrated in FIG. 5B, the subpanels 510A-C may be offset from, and attached to, the base panel 502 via one or more standoffs 514A, 514B. The distance between each subpanel 510A-C may be defined by a length of each standoff 514A, 514B. The standoffs may be configured as rods, cylindrical standoffs, polygonal-shaped (e.g., square, rectangular, or hexagonal cross-section, etc.) standoffs, etc., that include external threads (e.g., threaded rod, etc.), internal threads (e.g., threaded bore, etc.), and/or through-hole (e.g., smooth bore, etc.) features.

The center shaft 520 may include a shaft lumen 522 extending a length along the center axis 518 of the shaft 520. In some embodiments, the shaft lumen 522 may run from a first end of the center shaft 520 to an opposite second end of the center shaft 520. In one embodiment, a pass-through aperture may be disposed in a periphery of the center shaft 520 and into the shaft lumen 522. Although electrical wires (e.g., power and communication leads, etc.) may be run through the shaft lumen 522 from the first end to the second end, and vice versa, the pass-through aperture may be used to run electrical wires from electrical components disposed at various points along the length of the center shaft 520. Among other things, running these wires through the shaft lumen 522 avoids the need for a slip-ring between rotationally moving components (e.g., the jog dial 504 and code wheel 524) and rotationally fixed components (e.g., the encoder sensor 528, the center shaft 520, etc.).

The jog dial 504 may be configured to rotate about the center axis 518 via one or more radial bearings 536 disposed between a portion of the jog dial 504 body and the center shaft 520. The radial bearings 536 may include bearing assemblies comprising an outer race, an inner race, and a plurality of hardened steel balls disposed between the inner and outer races. The plurality of hardened steel balls may be captured or held in a circular pattern separated, and equidistant, from one another around a circumference of the radial bearings 536 by a cage or frame. Examples of these radial bearings 536 may include low-friction ABEC-type ball bearings, roller bearings, thrust bearings, needle bearings, bushings, air bearings, etc., and/or combinations thereof. In some embodiments, the jog dial 504 may have a first end where the touchpad is disposed and an opposite second end where the radial bearings 536 may be disposed. The first end may be exposed and visible to a user, while the second end may be hidden under a base panel 502 or some other mount surface. When two radial bearings 536 are employed, the radial bearings 536 may be offset, or separated, from one another by a separation distance. In one embodiment, a spacer 538 may be used to physically separate each of the radial bearings 536 disposed at least partially within the second end of the jog dial 504. In another embodiment, a counterbore or receptacle, in the jog dial 504 may be configured to physically separate each of the radial bearings 536 disposed in the second end of the jog dial 504. In any event, the physical separation of the radial bearings 536 by a separation distance may provide rotational stability for the jog dial 504. As can be appreciated, as the separation distance between the radial bearings 536 is increased, the axial and rotational stability of the jog dial 504 increases, and vice versa.

As described above, the touchpad 508 may be attached to the center shaft 520 in a rotationally fixed manner. In some embodiments, a touchpad support member 512 may be fixedly attached directly to the center shaft 520. In one embodiment, the touchpad support member 512 may be attached to a shaft collar 516A. The shaft collars 516A-516C described herein, may be arranged as a split-collar, threaded shaft collar, threaded bore collar, smooth bore collar, etc., and may be clamped to or screwed into the center shaft 520 providing a rotationally fixed attachment between the touchpad support member 512 and the center shaft 520.

The jog dial user interface device 104 may include a number of input modalities, as described herein. In addition to jog dial 504 rotation and touchpad 508 input, the jog dial user interface device 104 may allow for an axial displacement input such as a click, press, or selection input in the Z-axis direction. In one embodiment, a spring 540 may be disposed between at least one of the fixed linear bearings 544 and the jog dial 504. For instance, the spring 540 may be disposed between a lower surface of one of the radial bearings 536 and a surface of an upper fixed linear bearing 544. The spring 540 may be configured as one or more compression springs. Examples of compression springs may include, but are in no way limited to helical compression springs, die springs, Belleville springs/washers, leaf springs, any other spring element/assembly that elastically compresses under load, and/or combinations thereof. In any event, the spring 540 in an uncompressed state, may correspond to a default or non-axial input state of the jog dial user interface device 104. When in a compressed state, the spring 540 may deflect allowing the jog dial 504 and/or the touchpad 508 to move, or displace, a specific distance along the center axis 518. This displacement may cause a sensor, switch (e.g., input switch 224), or button to be activated providing the selection input. In some embodiments, the jog dial 504 may move in the axial direction independently of the touchpad 508. In one embodiment, the jog dial 504 and the touchpad 508 may move in the axial direction together (e.g., axially tied to one another). The shaft collars 516B, 516B may limit an axial movement of the jog dial 504, the touchpad 508, and/or the center shaft 520 to a specific distance.

As shown in FIGS. 5B and 5C, the jog dial user interface device 104 may include at least one code wheel 524 and encoder sensor 528. Although shown disposed within the internal cavity 526 of the jog dial 504, the code wheel 524 and/or encoder sensor 528 may be disposed outside of the jog dial 504. For example, the code wheel 524 may be attached to an external portion of the jog dial 504 (e.g., at the second, hidden, end of the jog dial 504) and the encoder sensor 528 may be fixedly attached to the base panel 502, a subpanel 510A, the center shaft 520, or any other rotationally fixed portion of the jog dial user interface device 104 or user interface system 200.

However, as illustrated at least in FIGS. 5B and 5C, the code wheel 524 and the encoder sensor 528 are both disposed within the internal cavity 526 of the jog dial 504. The code wheel 524 may be mounted to an inner circumferential surface, or lip, of the jog dial 504. As the jog dial 504 rotates about the center axis 518 the code wheel 524 moves, in unison, together with the jog dial 504. The encoder sensor 528 may be fixedly attached to the rotationally fixed center shaft 520. In some embodiments, the encoder sensor 528 may be attached to a support plate 532 that is interconnected to the center shaft 520. The support plate 532 and the encoder sensor 528 are prevented from rotating with rotation of the jog dial 504. In some embodiments, the support plate 532 may be attached to an encoder shaft collar 516B that is fixed to the center shaft 520. In this arrangement, as the jog dial 504 rotates, the encoder sensor 528 is maintained in a fixed position and prevented from rotating, and is configured to read the plurality of position identification features disposed in a pattern around a periphery of the encoder wheel 524 to determine a rotation, speed of rotation, position, and/or a change thereof over time, of the jog dial 504.

In FIG. 5C, an electrical interconnection is shown to the touchpad 508 and the encoder sensor 528. In some embodiments, the touchpad 508 may include a connector 548 configured to join the electrical components of the touchpad 508 with other components (e.g., processor 204, power supply, etc.) of the jog dial user interface device 104 and/or the user interface system 200, via first electrical leads 552A. In addition, the encoder sensor 528 may be connected with the other components (e.g., processor 204, power supply, etc.) of the jog dial user interface device 104 and/or the user interface system 200, via second electrical leads 552B. The first electrical leads 552A and/or the second electrical leads 552B may be configured and/or sized to pass through the shaft lumen 522 of the center shaft 520. Because the touchpad 508 and the encoder sensor 528 are fixed relative to the rotationally fixed center shaft 520, the electrical leads 552A, 552B can be routed from the jog dial user interface device 104 to other fixed components (e.g., display device 112, computer system 232, etc., without twisting, rotating, or tangling about the center axis 518.

Figure 6A:
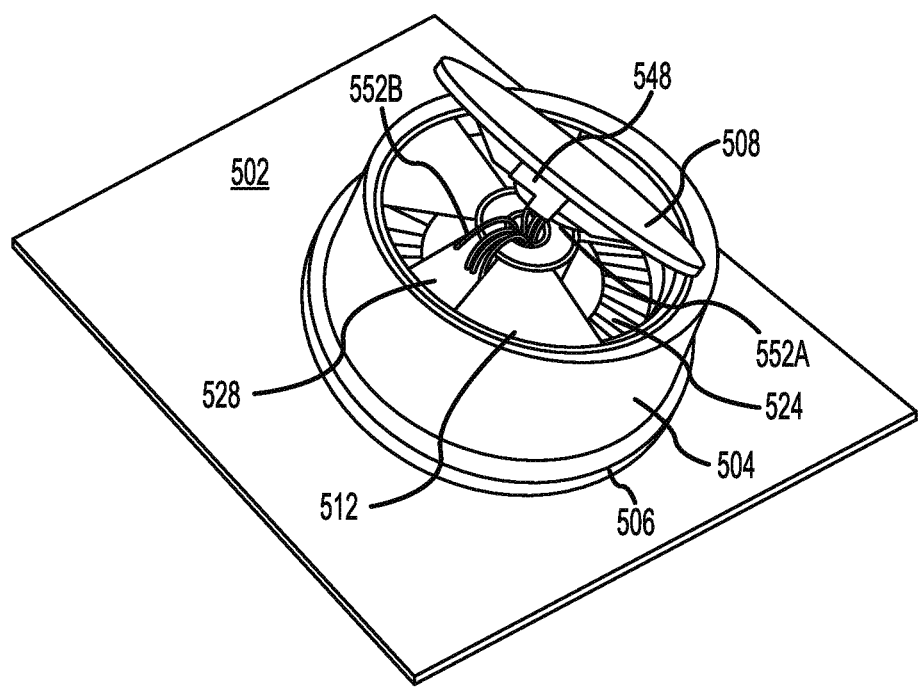
FIG. 6A shows a perspective view of a partially disassembled jog dial in accordance with embodiments of the present disclosure.
Figure 6B:
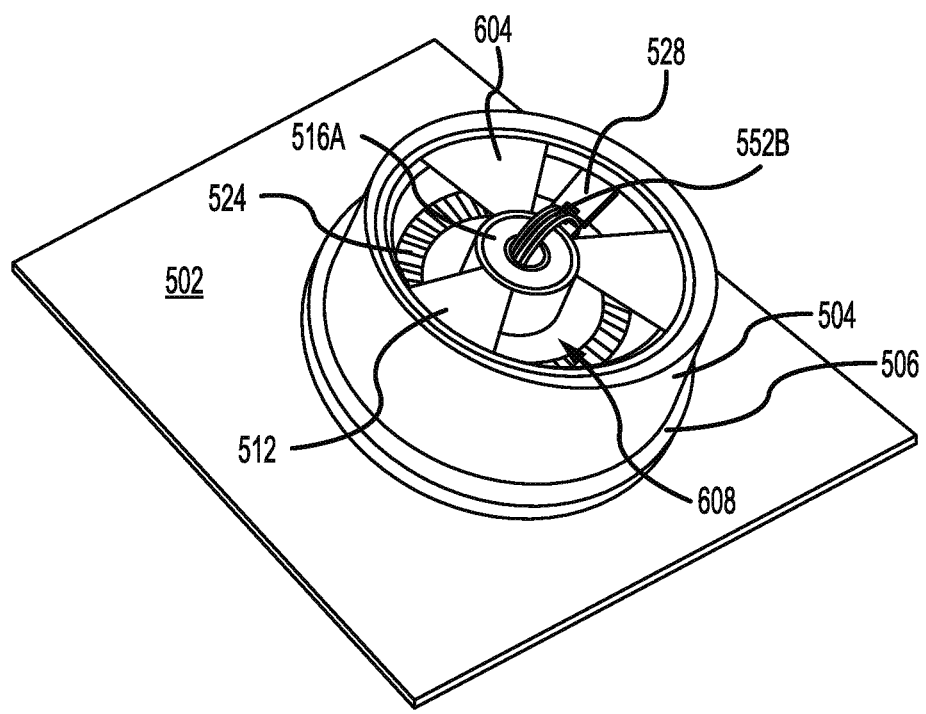
FIG. 6B shows a plan view of a partially disassembled jog dial in accordance with embodiments of the present disclosure.

FIGS. 6A and 6B show various views of a partially disassembled jog dial 504 in accordance with embodiments of the present disclosure. In particular, FIG. 6A shows a perspective view of a partially disassembled jog dial 504 with the touchpad 508 being removed, and FIG. 6B shows a plan view of the partially disassembled jog dial 504 with the touchpad 508 completely removed. As shown in FIG. 6A, the first electrical leads 552A and the second electrical leads 552B are routed from the touchpad 508 and the encoder sensor 528, respectively, through the shaft lumen 522 of the center shaft 520.

The touchpad support member 512, in some embodiments, may include two or more support webs 604 that are separated by one or more support openings 608. The support webs 604 may radially extend outwardly from a center of the jog dial 504 to a point inside the internal cavity 526 and adjacent to an internal periphery of the jog dial 504. The touchpad 508 may be attached to the touchpad support member 512 at the support web 604 and/or a circumferential ring joining the support webs 604 at the point adjacent to the internal periphery of the jog dial 504. The circumferential ring joining the support webs 604 may be integrally formed in the touchpad support member 512. The structure and arrangement of the touchpad support member 512 provides a support for the touchpad 508 while simultaneously providing access to the shaft lumen 522 (e.g., for the second electrical leads 552B, etc.) via the support openings 608 disposed between the two or more support webs 604.

Figure 7:
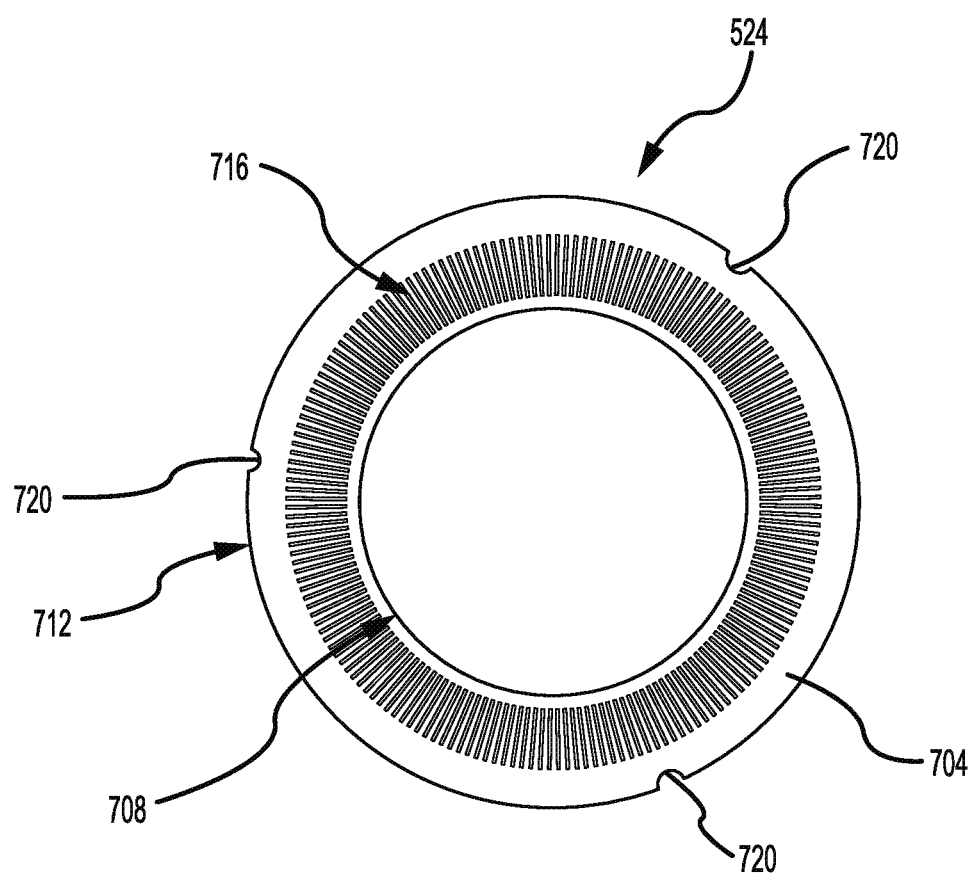
FIG. 7 shows a plan view of a rotary encoder ring for the jog dial user interface device in accordance with embodiments of the present disclosure.

FIG. 7 shows a plan view of a rotary encoder ring, or code wheel 524, for the jog dial user interface device 104 in accordance with embodiments of the present disclosure. The code wheel 524 may comprise a code wheel substrate 704, or body. In some embodiments, the code wheel substrate 704 may be configured as a substantially flat disk. In any event, the code wheel 524 may include a code wheel center aperture 708 passing through the code wheel substrate 704, an outer edge 712, and a plurality of position identification features (e.g., transparent resolution features 716) disposed in a pattern around a periphery of the code wheel center aperture 708 of the code wheel 524. In some embodiments, the code wheel 524 may include one or more wheel location features 720 that align the code wheel 524 to the jog dial 504. In one embodiment, the wheel location features 720 may locate with corresponding features (e.g., protrusions, protuberances, etc.) disposed inside the internal cavity 526 of the jog dial 504. In some embodiments, the code wheel 524 may be staked, welded, fastened, adhered, and/or otherwise attached to the jog dial 504 via the wheel location features 720, the outer edge 712, the code wheel center aperture 708, and/or any other feature of the code wheel 524.

The code wheel 524 may include a plurality of transparent resolution features 716 disposed in a pattern around a center of the wheel 524. These transparent resolution features 716 may be configured as apertures, transparent windows, slits, cutouts, etc., that light may pass through. In some embodiments, the light may be provided by the encoder sensor 528 that includes a light emitting element and a light receiving element disposed on opposite sides of the code wheel 524. A density and/or size of the transparent resolution features 716 may define a rotational resolution, or sensitivity, of the jog dial user interface device 104. For example, the greater the number of transparent resolution features 716, the greater the resolution of the jog dial user interface device 104, and vice versa.

Figure 8A:
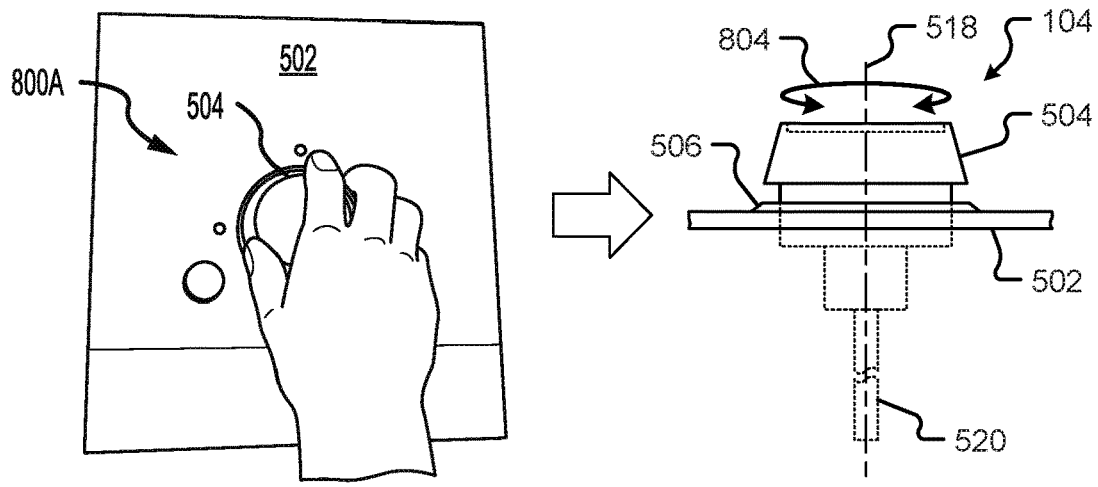
FIG. 8A shows a jog dial user interface device state for a first input type in accordance with embodiments of the present disclosure.
Figure 8B:
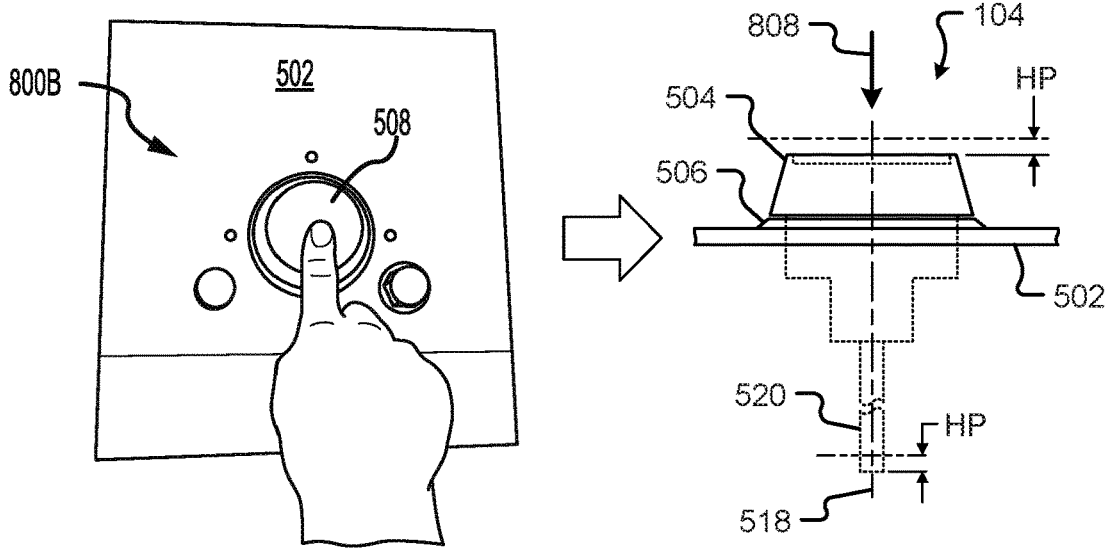
FIG. 8B shows a jog dial user interface device state for a second input type in accordance with embodiments of the present disclosure.
Figure 8C:
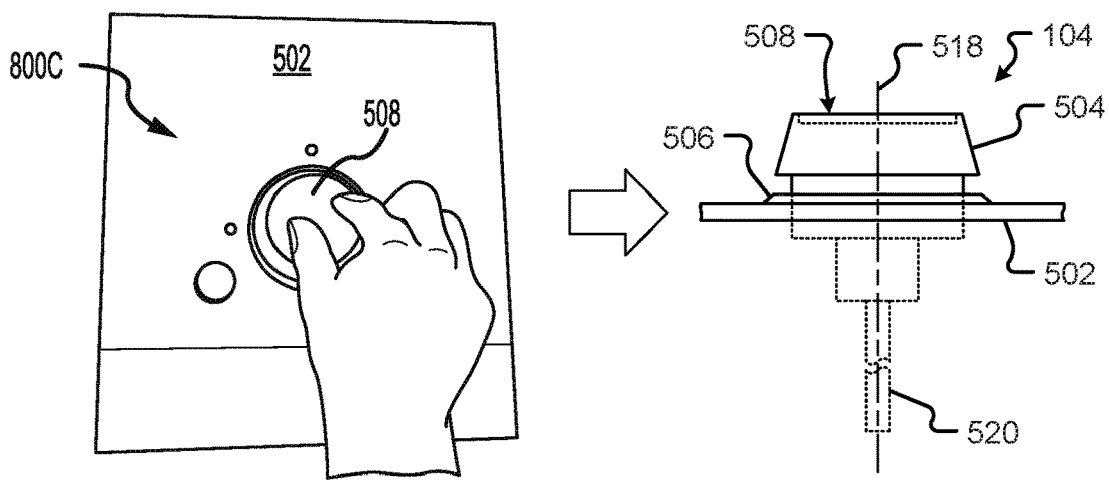
FIG. 8C shows a jog dial user interface device state for a third input type in accordance with embodiments of the present disclosure.

FIGS. 8A-8C show various states of the jog dial user interface device 104 and corresponding inputs in accordance with embodiments of the present disclosure. Each of FIGS. 8A-8C show a specific type of user input 804, 808 and a schematic representation of the jog dial user interface device 104 that corresponds to the specific type of user input 804, 808 provided.

FIG. 8A shows a rotational input 804 of the jog dial 504 in a first interface state 800A of the jog dial user interface device 104. The rotational input 804 turns the jog dial 504 relative to the center shaft 520 and the touchpad 508. A rotational input 804 may be used to navigate through objects rendered to a display device 112, such as lists, images, icons and the like.

FIG. 8B shows a linear actuation input 808 provided to the jog dial 504 and/or the touchpad 508 in a second interface state 800B of the jog dial user interface device 104. In particular, the linear actuation input 808 may displace the jog dial 504, the touchpad 508, and/or the center shaft 520, a specific distance, HP, from a default position to an actuated, or input, position. The linear actuation input 808 may be provided in a direction along the center axis 518. In some embodiments, this type of linear actuation input 808 may correspond to a selection input that selects an icon, image, list element, application, or other visible object rendered to the display 256 of the display device 112.

FIG. 8C shows a touch-based input of the touchpad 508 in a third interface state 800C of the jog dial user interface device 104. The touch-based input may correspond to a tap, double-tap, triple-tap, drag, tap-and-hold, gesture, multi-touch, or other touch input provided at a surface of the touchpad 508. In this third interface state 800C, the jog dial 504 is not required to rotate or displace along the center axis 518. A touch-based input may be used to navigate through objects rendered to a display device 112, such as lists, images, icons and the like, resize objects rendered to the display device 112, and/or switch between windows and/or applications rendered to the display device 112, etc.

Figure 9:
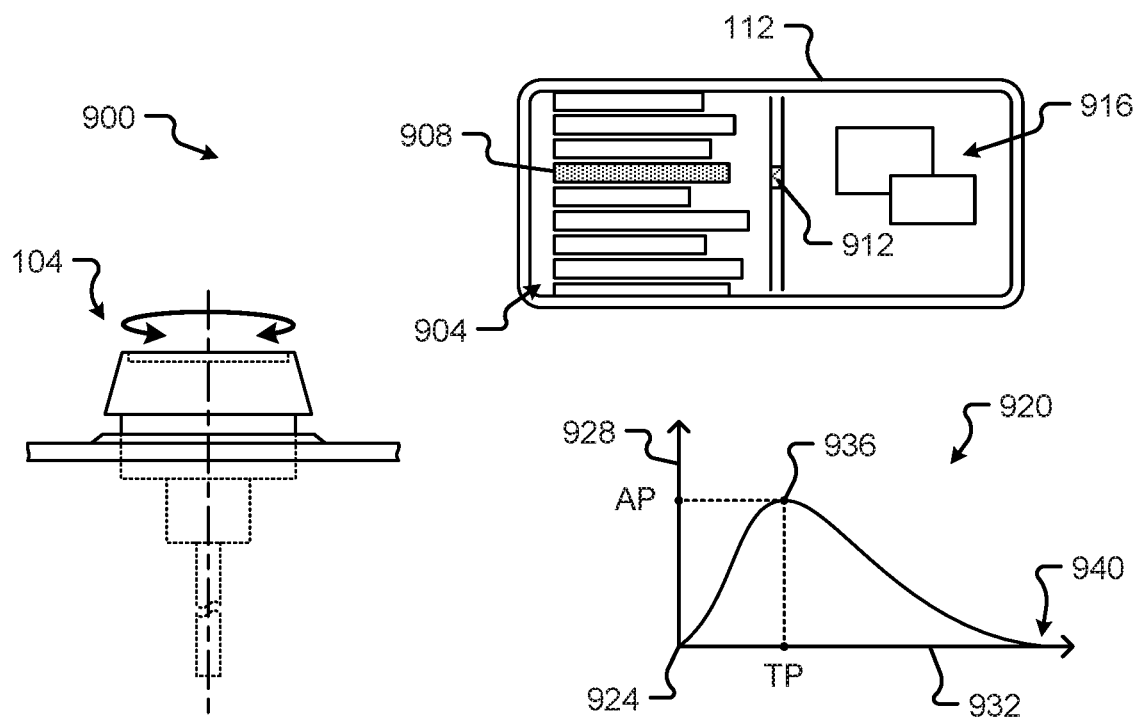
FIG. 9 shows a jog dial user interface device and display interaction for scrolling through lists in accordance with embodiments of the present disclosure.

FIG. 9 shows a schematic representation of a first interaction 900 defining a movement of the jog dial user interface device 104, a display interaction corresponding to the movement of the jog dial user interface device 104, and a graphical representation of the movement associated with the jog dial 504 during the movement. The movement shown in FIG. 9 is a free-spin movement where the jog dial 504 is rotated by a user and allowed to continue to rotate under a momentum of the jog dial 504 spinning about the center shaft 520 without further user contact. As shown in the momentum graphical representation 920, a movement curve is shown displaying a magnitude of the jog dial 504 rotation speed along the vertical axis 928 and a corresponding time along the horizontal axis 932. The movement curve starts at the origin 924 and ends at the end of rotation 940 point along the horizontal axis 932.

In some embodiments, a user may impart an initial rotation force at origin 924. The initial rotation force may correspond to the user spinning the jog dial 504 and then letting go of the jog dial 504 at some point in time along the curve. The movement curve may reach a peak 936 having a peak speed and/or acceleration value, AP, at time TP. As the jog dial 504 spins under its own mass and friction (e.g., air resistance, bearing friction, etc.) the jog dial 504 may coast to a stop at the end of rotation 940.

In one embodiment, the jog dial 504 may be spun as shown in FIG. 9 to navigate and/or scroll through lists rendered to a display device 112. The display device 112 may include a number of visible objects rendered in a list presentation 904. The list presentation 904 may include a selection focus 908 (e.g., a highlighted element, etc.) associated with the position of the scrolling list, etc. In some embodiments, the images rendered to the display device 112 may include a scroll level indicator 912 that, among other things, indicates a relative position of the visible object in the selection focus 908 to the list of objects in the list presentation 904. The display device 112 may be separated to show the list presentation 904 in one area of the display device 112 and other displayed objects 916 in another area of the display. The displayed objects 916 may correspond to objects associated with the list object in the selection focus 908 of the list presentation 904.

As described herein, the speed at which the list presentation 904 moves objects in and out of the visible area of the display device 112 may be tied to the speed of the jog dial 504 as it rotates under its own momentum. For example, the display of the objects may move at a speed that exactly follows the movement curve shown in the momentum graphical representation 920. By way of example, as a user free-spins the jog dial 504 and the dial 504 begins to naturally slow down at a rate of speed, the scrolling effect rendered to the display device 112 would slow down at the same rate of speed.

Figure 10:
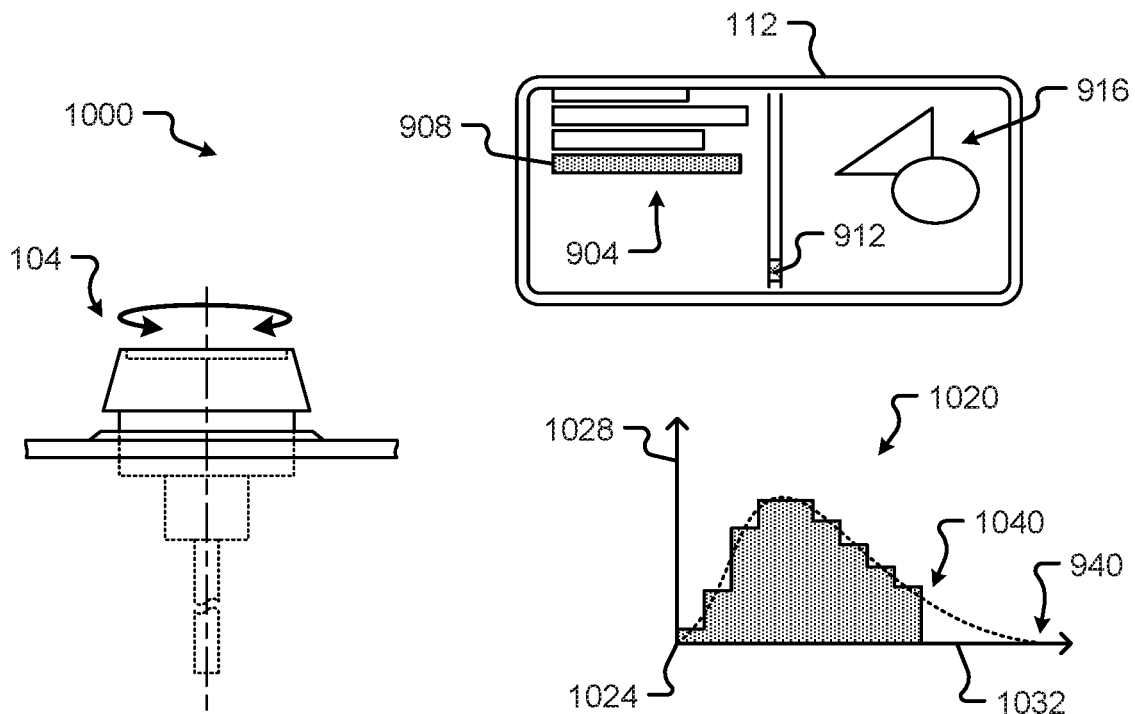
FIG. 10 shows a jog dial user interface device and display interaction upon reaching an end of a list in accordance with embodiments of the present disclosure.

FIG. 10 shows a schematic representation of a second interaction 1000 defining a movement of the jog dial user interface device 104 upon reaching an end of a list, a display interaction corresponding to the movement of the jog dial user interface device 104 reaching the end of a list, and a graphical representation of the haptic feedback associated with the jog dial 504 as it follows the movement curve and reaches the end of the list. The curve shown in dashed lines in FIG. 10 may correspond to the free-spin movement of FIG. 9 where the jog dial 504 is rotated by a user and allowed to continue to rotate under a momentum of the jog dial 504 spinning about the center shaft 520 without further user contact. The digital area associated with the curve may correspond to a number of haptic outputs provided by the haptic device(s) 228 of the jog dial user interface device 104 as the jog dial 504 spins according to the curve. These haptic outputs may provide a scrolling resistance, or feel, by vibrating a portion of the jog dial user interface device 104 (e.g., the center shaft 520, the jog dial 504, the touchpad 508, etc.) during rotation. For example, the faster the jog dial 504 spins, the greater the number of haptic outputs provided, and the slower the jog dial 504 spins, the fewer the number of haptic outputs provided.

As shown in the scroll resistance graphical representation 1020, the movement curve from FIG. 9 is superimposed over a haptic output graph, represented by a discrete number of haptic outputs over time. The amount, or number, of haptic outputs is represented along the vertical axis 1028 and a corresponding time for the number of haptic outputs provided along the movement curve is represented by the horizontal axis 1032. The haptic outputs start at the origin 1024 and end when the end of list 1040 has been reached, regardless of whether the jog dial 504 is continuing to spin.

The haptic device(s) 228 of the jog dial user interface device 104 may be configured to apply haptic feedback when the jog dial 504 is rotated between options in a user interface presentation and cease haptic feedback when a selection focus 908 reaches a user interface limit allowing the dial 504 to spin freely (e.g., without additionally applied resistance). While the haptic feedback at one or more points of rotation can provide a virtual detent effect by essentially transmitting energy (e.g., in the form of movement, vibration, etc.) to the jog dial 504 as it is rotated, the present disclosure describes a user interaction where the haptic feedback and/or outside resistance is eliminated allowing the dial 504 to spin freely. In some cases, the cessation of haptic feedback may be accompanied by a break in auditory output (e.g., providing a silence), or a sound that indicates the dial has reached the user interface limit (e.g., whistling, etc.).

As shown in the scroll resistance graphical representation 1020 of FIG. 10, upon reaching the end of a list, menu, or group of options, in a displayed user interface (e.g., list presentation 904), the haptic feedback provided by the haptic device(s) 228 of the jog dial user interface device 104 may be completely eliminated or ceased. This cessation has the effect of providing a recognizable difference to a user (e.g., indicating that the end of the list has been reached, etc.) from the virtual detents provided when moving between items in a list.

Figure 11A:
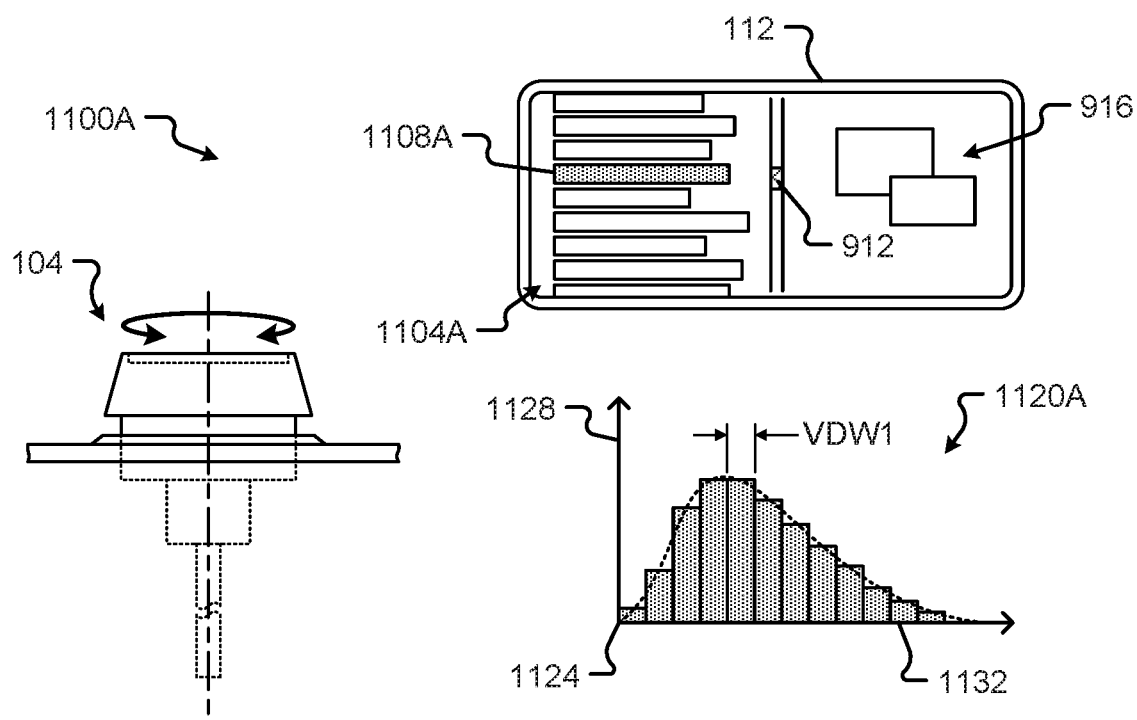
FIG. 11A shows a haptic output for a jog dial user interface device during a first display interaction in accordance with embodiments of the present disclosure.
Figure 11B:
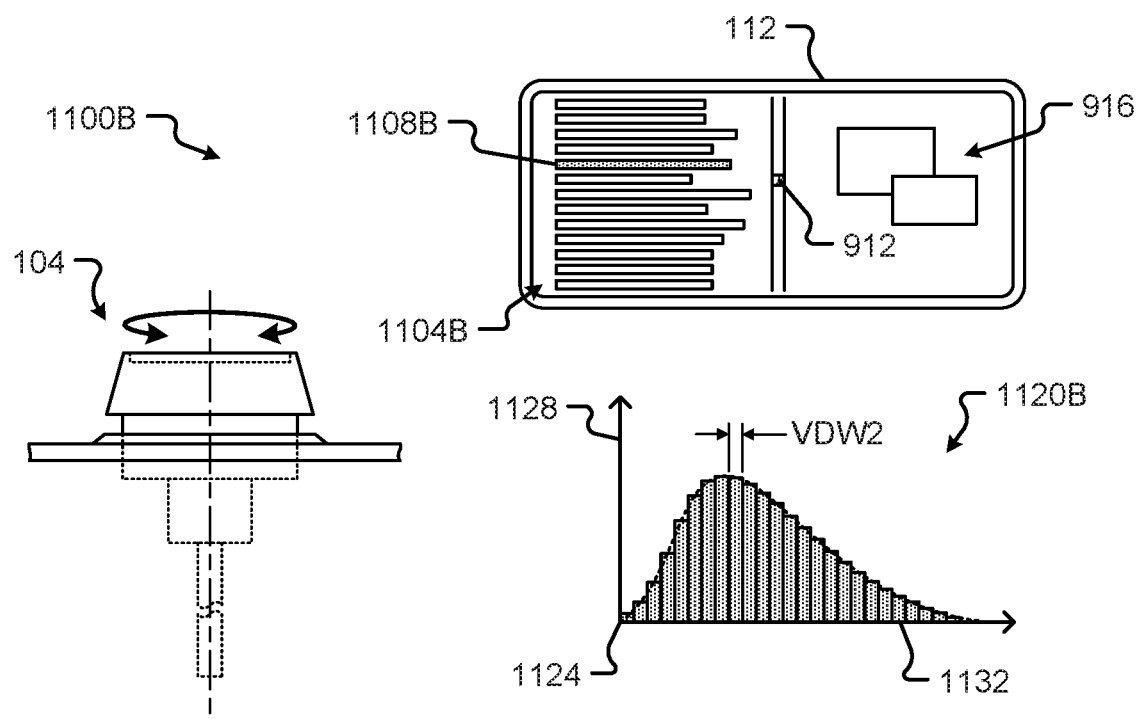
FIG. 11B shows a haptic output for a jog dial user interface device during a second display interaction in accordance with embodiments of the present disclosure.

FIGS. 11A and 11B show a variable detent associated with the haptic output provided by the haptic device(s) 228 over time. The size of the variable detent may depend on a number of items in a list, a number of objects displayed, and/or a speed of rotation associated with the jog dial 504. The haptic output interactions 1100A, 1100B shown in FIGS. 11A and 11B show a schematic representation of a movement of the jog dial user interface device 104 as the jog dial 504 rotates and scrolls through a first and second list presentation 1104A, 1104B, a display interaction corresponding to the movement of the jog dial user interface device 104 through the lists, and a graphical representation of the haptic feedback and variable detent size associated with the haptic output provided to the jog dial 504 as it follows the movement curve and navigates through the lists. The curves shown in dashed lines in FIGS. 11A and 11B may correspond to the free-spin movement graph of FIG. 9.

FIG. 11A shows a variable detent size graphical representation 1120A associated with a first list presentation 1104A having a first number of list items. The first list presentation focus 1108A is shown in a first position in the first list presentation 1104A along with a list item having a first size. As shown in the variable detent size graphical representation 1120A, the movement curve from FIG. 9 is superimposed over a haptic output graph, represented by a discrete number of haptic outputs over time. The amount, or number, of haptic outputs is represented along the vertical axis 1128 and a corresponding time for the number of haptic outputs provided along the movement curve is represented by the horizontal axis 1132. The haptic outputs start at the origin 1124 and may end at the end of list 1040 or the rotation of the jog dial 504 as described herein.

In FIG. 11A, the first variable detent width, VDW1, may be based on the number of items in the list associated with the first list presentation 1104A. The first variable detent width, VDW1, may correspond to a time for each haptic output provided by the haptic device(s) 228 of the jog dial user interface device 104. The size of the variable detent width increases, providing a longer haptic output duration, as the number of the items in a list decreases. Additionally or alternatively, the size of the variable detent width decreases, providing a shorter haptic output duration, as the number of the items in a list increases. In some embodiments, the duration of each variable detent and the haptic output associated therewith is inversely proportional to the number of items in the list.

FIG. 11B shows an adjusted variable detent size graphical representation 1120B associated with a second list presentation 1104B having a second different number of list items. The second list presentation focus 1108B is shown in a position in the second list presentation 1104B along with a list item having a second size (e.g., that is greater than the list item having the first size).

In FIG. 11B, the second variable detent width, VDW2, may be based on the number of items in the list associated with the second list presentation 1104B. The second variable detent width, VDW2, may correspond to a decreased time for each haptic output provided by the haptic device(s) 228 of the jog dial user interface device 104. The size of the variable detent width decreases, providing a shorter haptic output duration, as the number of the items in a list increases. As provided above, the duration of each variable detent and the haptic output associated therewith may be inversely proportional to the number of items in a given list.

The variable detents described in conjunction with FIGS. 11A and 11B may be dynamically and continually adjusted in response to determining a number of items associated with a particular list and list presentation 1104A, 1104B to render to a display device 112.

Figure 12:
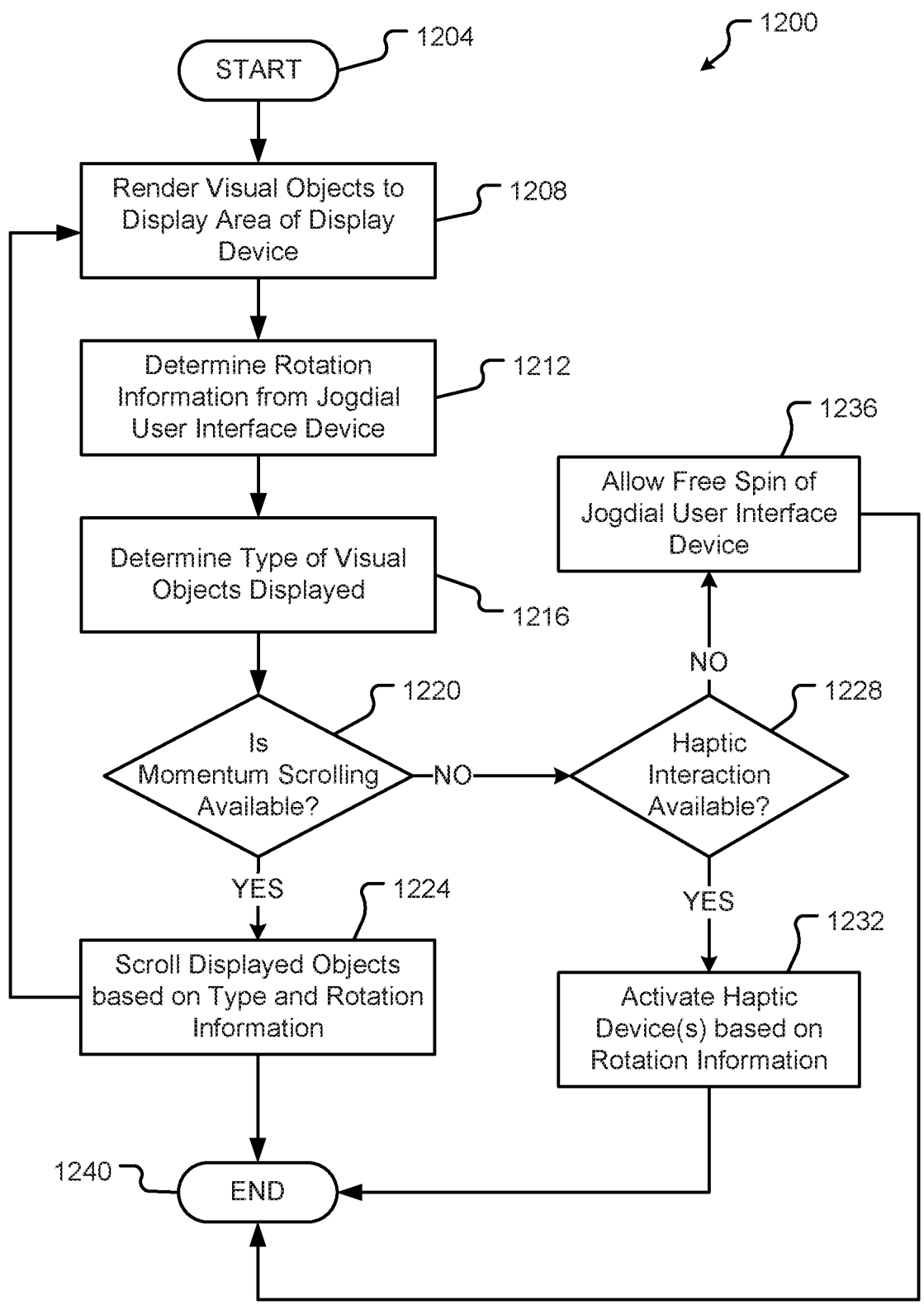
FIG. 12 is a flow diagram of a method for controlling displayed content via actuation of a jog dial user interface device in accordance with embodiments of the present disclosure.

FIG. 12 is a flow diagram of a method 1200 for controlling displayed content via actuation of a jog dial user interface device 104 in accordance with embodiments of the present disclosure. While a general order for the steps of the method 1200 is shown in FIG. 12, the method 1200 can include more or fewer steps or can arrange the order of the steps differently than those shown in FIG. 12. Generally, the method 1200 starts with a start operation 1204 and ends with an end operation 1240. The method 1200 can be executed as a set of computer-executable instructions executed by a computer system (e.g., computer system 232, processor 204, etc.) and encoded or stored on a computer readable medium (e.g., data storage 208, memory 212, etc.). Hereinafter, the method 1200 shall be explained with reference to the systems, components, assemblies, devices, user interfaces, environments, software, etc. described in conjunction with FIGS. 1-11B.

The method 1200 begins at step 1204 and proceeds by rendering visual objects to a display area of a display device 112 (step 1208). The visual objects may correspond to any object that is rendered to the display 256 of the display device 112. In one embodiment, the visual objects may correspond to a list of items displayed in a list format to the display device 112.

Next, the method 1200 determines rotation information from the jog dial user interface device 104 (step 1212). The rotation information may include an amount of rotation (e.g., angular increment of rotation) of the jog dial 504, a speed or velocity of the rotation at one or more times, an acceleration of the jog dial 504 rotating over time, and/or changes thereto. In some embodiments, the rotation information may indicate whether the jog dial 504 is spinning under momentum, without user contact. For example, the computer system may determine that the jog dial 504 is spinning according to a movement curve or curve shape stored in a memory device of the jog dial user interface device 104 and/or the user interface system 200. The rotation information may be determined based on a measurement of the rotation of the jog dial 504 from the code wheel 524 moving relative to the encoder sensor 528.

The method 1200 may continue by determining a type of the visual objects displayed, or rendered, to the display device 112 (step 1216). In some cases, the visual objects may include objects of a type that can be navigated between or through. These types of objects may include, but are in no way limited to, lists, grids, organized icons, arrays of images or icons, matrices, etc., and/or combinations thereof. Some visual objects may be of a type that cannot be navigated between or through. These types of objects may include, but are in no way limited to, single images, icons, ends of lists, etc., and/or combinations thereof.

As described above, the method 1200 may proceed by determining if momentum scrolling is available based on one or more of the type of the visual objects displayed and/or the rotation information from the jog dial user interface device 104 (step 1220). In one embodiment, the momentum scrolling may not be available if it is determined that the jog dial 504 is under user contact and not free spinning.

If momentum scrolling is available, the method 1200 proceeds by scrolling displayed objects based on the type and rotation information determined (step 1224). For example, the speed and/or acceleration at which items in a list presentation are displayed (e.g., moved in and out of the visible area of the display device 112, etc.) may be tied to the speed of the jog dial 504 as it rotates under its own momentum. In this example, the display of the objects may move at a speed that exactly follows the movement curve of the jog dial 504 spinning without user contact. As a user free-spins the jog dial 504 and the jog dial 504 may begin to naturally slow down at a specific rate of speed and, in response, the scrolling effect rendered to the display device 112 by the computer system would slow down at the same rate of speed. The method 1200 may continue to repeat or end at step 1240.

If momentum scrolling is not available, the method 1200 may continue by determining whether haptic interaction is available (step 1228). In some embodiments, haptic interaction may be available where items in the list of items displayed remain to move into the selection focus in a display device 112. Additionally or alternatively, haptic interaction may not be available where items in the list of items displayed do not remain to move into the selection focus in a display device 112. In the latter example, haptic interaction may not be available when the end of a list has been reached.

Where haptic interaction is available, the haptic device(s) 228 of the jog dial user interface device 104 may continue to provide haptic output (e.g., by vibrating a portion of the jog dial user interface device 104) based on the rotation information determined in step 1212 (step 1232). Where haptic interaction is not available, the haptic output provided by the haptic device(s) 228 may be ceased, or stopped, allowing the jog dial 504 to rotate in accordance with the rotational information by free spinning, etc. (step 1236). The method 1200 ends at step 1240.

Figure 13:
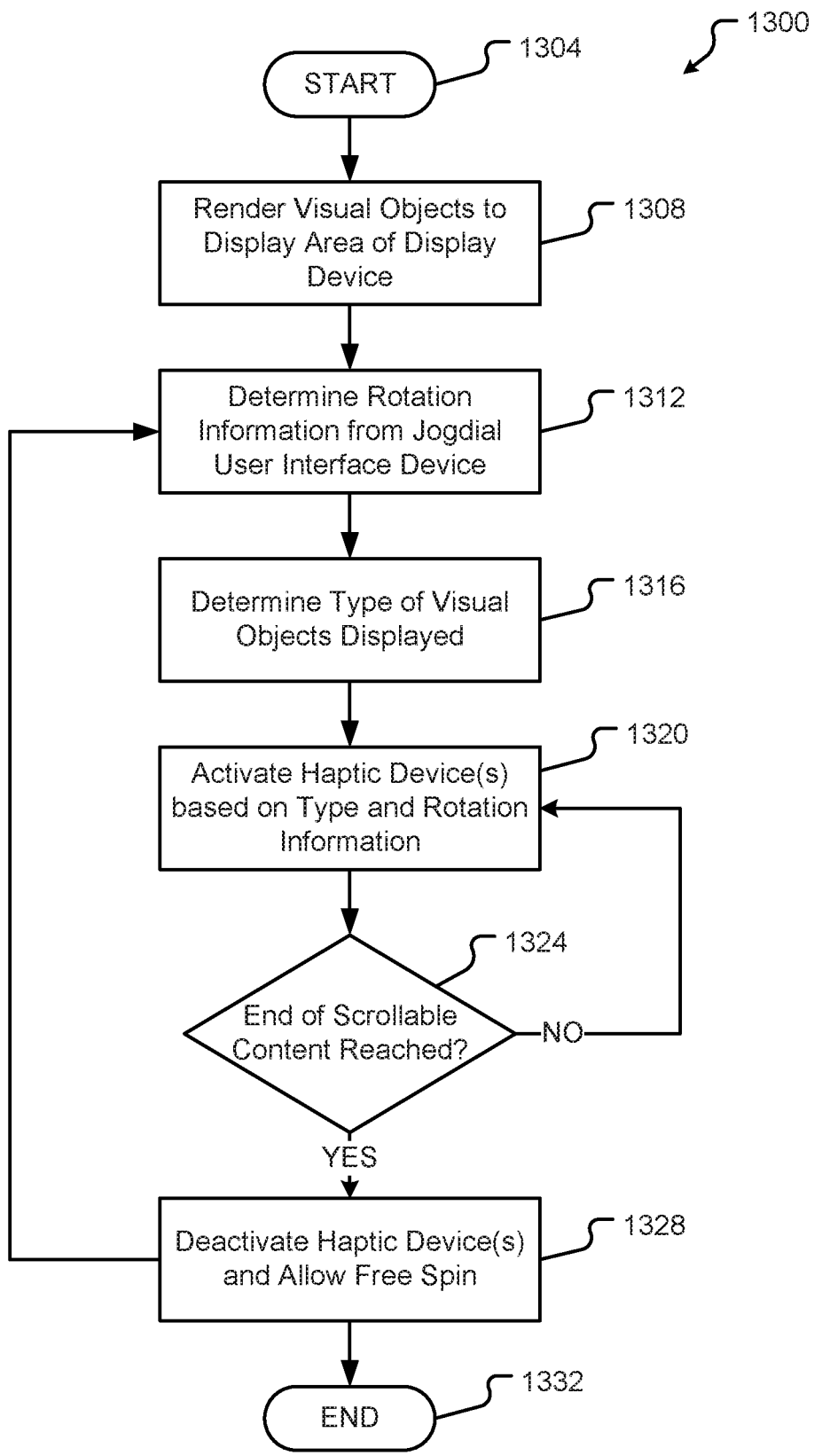
FIG. 13 is a flow diagram of a method for controlling physical haptic output of a jog dial user interface device based on a cursor location in displayed content in accordance with embodiments of the present disclosure.

FIG. 13 is a flow diagram of a method 1300 for controlling physical haptic output of a jog dial user interface device 104 based on a cursor location in displayed content in accordance with embodiments of the present disclosure. While a general order for the steps of the method 1300 is shown in FIG. 13, the method 1300 can include more or fewer steps or can arrange the order of the steps differently than those shown in FIG. 13. Generally, the method 1300 starts with a start operation 1304 and ends with an end operation 1332. The method 1300 can be executed as a set of computer-executable instructions executed by a computer system (e.g., computer system 232, processor 204, etc.) and encoded or stored on a computer readable medium (e.g., data storage 208, memory 212, etc.). Hereinafter, the method 1300 shall be explained with reference to the methods, systems, components, assemblies, devices, user interfaces, environments, software, etc. described in conjunction with FIGS. 1-12.

The method 1300 begins at step 1304 and proceeds by rendering visual objects to a display area of a display device (step 1308), determining rotation information from the jog dial user interface device 104 (step 1312), and determining a type of the visual objects displayed (step 1316). In some embodiments, steps 1308, 1312, and 1316 may be similar, if not identical, to steps 1208, 1212, and 1216, respectively, as described in conjunction with FIG. 12.

Based on the type of visual objects displayed and the rotation information determined, the method 1300 may continue by activating the haptic device(s) 228 of the jog dial user interface device 104 to provide haptic output corresponding to an input feedback (step 1320). In some embodiments, the haptic output may be provided for every item in a list or for groups of items in a list. In one embodiment, the haptic output may be provided for a specific duration based on, for example, a size of the item or group of items in the list.

Next, the method 1300 determines whether an end of the scrollable content has been reached (step 1324). One example of an end of scrollable content may include, but is in no way limited to, reaching the end of a list of items. If the end has not been reached the method 1300 may return to activating the haptic device(s) 228 as described in step 1320.

Upon reaching an end of the list of objects or scrollable content, the method 1300 may proceed by ceasing the physical feedback and haptic output provided by the haptic device 228 allowing the jog dial 504 to rotate freely without any additional friction or braking (step 1328). The method 1300 may continue by returning to step 1312 in determining rotation information and repeating steps 1316 to 1328. In some embodiments, the method 1300 may end at step 1332.

Figure 14:
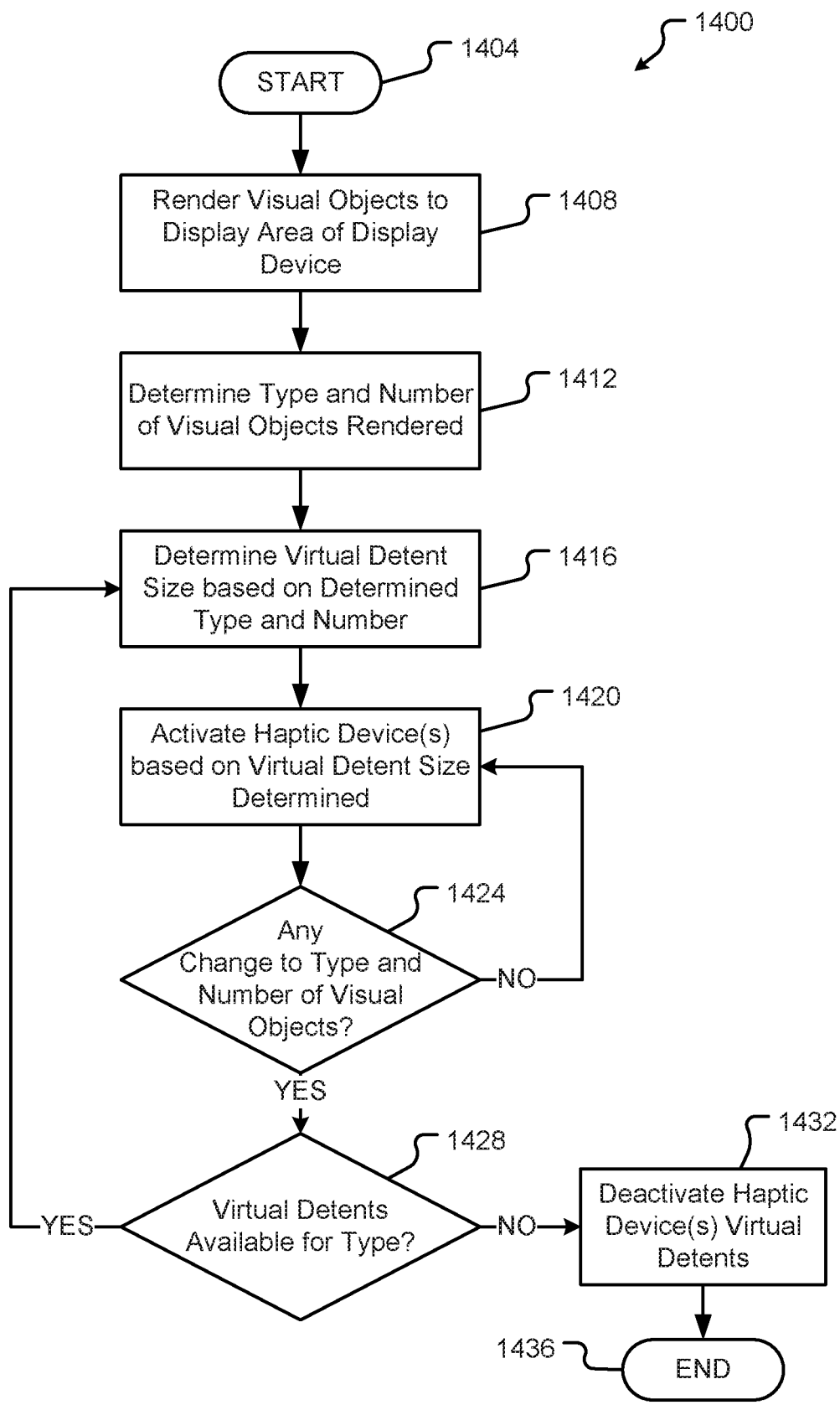
FIG. 14 is a flow diagram of a method for controlling an amount of physical haptic output of a jog dial user interface device based on a number of displayed elements in a user interface in accordance with embodiments of the present disclosure.

FIG. 14 is a flow diagram of a method 1400 for controlling an amount of physical haptic output of a jog dial user interface device 104 based on a number of displayed elements in a user interface in accordance with embodiments of the present disclosure. While a general order for the steps of the method 1400 is shown in FIG. 14, the method 1400 can include more or fewer steps or can arrange the order of the steps differently than those shown in FIG. 14. Generally, the method 1400 starts with a start operation 1404 and ends with an end operation 1436. The method 1400 can be executed as a set of computer-executable instructions executed by a computer system (e.g., computer system 232, processor 204, etc.) and encoded or stored on a computer readable medium (e.g., data storage 208, memory 212, etc.). Hereinafter, the method 1400 shall be explained with reference to the methods, systems, components, assemblies, devices, user interfaces, environments, software, etc. described in conjunction with FIGS. 1-13.

The method 1400 begins at step 1404 and proceeds by rendering visual objects to a display area of a display device (step 1408) and determining a type and number of the visual objects displayed (step 1412). In some embodiments, steps 1408 and 1412 may be similar, if not identical, to steps 1208 and 1216, respectively, as described in conjunction with FIG. 12. In one embodiment, step 1412 may include determining a size of a list rendered to the display device 112. For example, the method 1400 may include determining a number of items in a list that is to be displayed to the display device 112. The number of items may include a total count of the items in the list, a total number of items capable of being displayed in the display device 112, a number of items currently displayed, and/or the like.

In any event, the method 1400 may determine a virtual detent size based on the type and/or number of items in the list (step 1416). The virtual detent size may be correspond to the variable detent widths, VDW1 and VDW2, described in conjunction with FIGS. 11A and 11B. The size of the variable detent may correspond to an amount of time associated with a duration of haptic output (e.g., vibration). As the size of a list increases the size of the virtual detent decreases providing a haptic output with a shorter duration and as the size of the list decreases the size of the virtual detent increases providing a haptic output with a longer haptic output duration. As can be appreciated, the duration of each variable detent and the haptic output associated therewith may be inversely proportional to the number of items determined.

The method 1400 may proceed by activating the haptic device(s) 228 to produce a haptic output in accordance with the size determined in step 1416 (step 1420).

The size of the variable detents may be dynamically and continually adjusted in response to determining a change in the type and/or number of items associated with a particular list and list presentation (step 1424). If no change to the type or number is detected, the method 1400 returns to step 1420 and continues to provide the haptic output in accordance with the size determined in step 1416. If a change in the type of visual objects displayed is determined, the method 1400 may proceed to determine whether virtual detents are available for the change in type (step 1428). If virtual detents are available for a change in the type or if there is no change in type but the number of visual objects changes, the method 1400 may return to step 1416 to determine an adjusted size of the virtual detent. However, if virtual detents are not available for a change in the type, the method 1400 may proceed to deactivate the haptic devices and/or providing any virtual detents. The method 1400 ends at step 1436.

Any of the steps, functions, and operations discussed herein can be performed continuously and automatically.

The exemplary systems and methods of this disclosure have been described in relation to user interface methods, devices, and systems. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a user interface device, comprising: a longitudinal support shaft having a lumen extending a length along an axis of the longitudinal support shaft; a rotary dial having a first end and an opposite second end, the rotary dial including an internal cavity that opens to the first end, the rotary dial rotationally coupled to the longitudinal support shaft; and a touchpad disposed adjacent to the first end of the rotary dial and at least partially surrounded by a periphery of the rotary dial, the touchpad rotationally fixed to the longitudinal support shaft; wherein the rotary dial rotates about the longitudinal support shaft while the touchpad remains rotationally fixed to the longitudinal support shaft.

Aspects of the above device include wherein the lumen runs from a first end of the longitudinal support shaft arranged inside the internal cavity of the rotary dial to an opposite second end of the longitudinal support shaft arranged outside of the rotary dial. Aspects of the above device further comprising: an electrical interconnection operatively connected to the touchpad and disposed at least partially within the internal cavity of the rotary dial, wherein an electrical lead of the electrical interconnection passes through the lumen from the first end of the longitudinal support shaft to the second end of the longitudinal support shaft. Aspects of the above device further comprising: a support member interconnected to a periphery of the longitudinal support shaft at the first end of the longitudinal support shaft and radially extending outwardly from a center of the rotary dial to a point inside the internal cavity and adjacent to the periphery of the rotary dial, wherein the touchpad is attached to the support member. Aspects of the above device further comprising: an encoder wheel affixed to the rotary dial, the encoder wheel including a plurality of position identification features disposed in a pattern around a periphery of the encoder wheel; and an encoder sensor operatively coupled to read the plurality of position identification features of the encoder wheel, wherein the encoder sensor is rotationally fixed relative to the rotary dial, and wherein the encoder sensor is configured to detect the plurality of position identification features as the rotary dial and encoder wheel rotate relative to the encoder sensor. Aspects of the above device include wherein the encoder wheel and the encoder sensor are disposed in the internal cavity of the rotary dial, and wherein an electrical lead for the encoder sensor passes through the lumen of the longitudinal support shaft. Aspects of the above device include wherein the longitudinal support shaft is axially supported by a linear bearing surrounding a portion of the longitudinal support shaft at a point between the first end of the longitudinal support shaft and the second end of the longitudinal support shaft. Aspects of the above device include wherein the second end of the rotary dial includes two radial ball bearing assemblies axially separated from one another by a separation distance, and wherein an inner race of each of the two radial ball bearing assemblies surrounds a periphery of the longitudinal support shaft. Aspects of the above device further comprising: a spring disposed between the linear bearing and the second end of the rotary dial, wherein the rotary dial is displaceable along the axis and against a compressive force of the spring. Aspects of the above device include wherein the touchpad and the longitudinal support shaft are displaceable along the axis in conjunction with a displacement of the rotary dial.

Embodiments include 1 user interface system, comprising: a processor; a display device interconnected to the processor; and a user interface device interconnected to the processor, comprising: a longitudinal support shaft having a lumen extending a length along an axis of the longitudinal support shaft; a rotary dial having a first end and an opposite second end, the rotary dial including an internal cavity that opens to the first end, the rotary dial rotationally coupled to the longitudinal support shaft; and a touchpad disposed adjacent to the first end of the rotary dial and at least partially surrounded by a periphery of the rotary dial, the touchpad rotationally fixed to the longitudinal support shaft; wherein the rotary dial rotates about the longitudinal support shaft while the touchpad remains rotationally fixed to the longitudinal support shaft; wherein the processor is configured to receive user input provided via a rotation of the rotary dial, a touch or gesture via the touchpad, and/or an axial displacement of the rotary dial or the touchpad, and wherein the processor controls a display of the display device based on the user input received.

Aspects of the above system include wherein an electrical interconnection between the touchpad and the processor is disposed at least partially within the internal cavity of the rotary dial, and wherein an electrical lead of the electrical interconnection passes through the lumen from a first end of the longitudinal support shaft to a second end of the longitudinal support shaft. Aspects of the above system include wherein the user interface device further comprises a support member interconnected to a periphery of the longitudinal support shaft at the first end of the longitudinal support shaft and radially extending outwardly from a center of the rotary dial to a point inside the internal cavity and adjacent to the periphery of the rotary dial, wherein the touchpad is attached to the support member. Aspects of the above system include wherein the user interface device further comprises: an encoder wheel affixed to the rotary dial, the encoder wheel including a plurality of position identification features disposed in a pattern around a periphery of the encoder wheel; and an encoder sensor operatively coupled to read the plurality of position identification features of the encoder wheel, wherein the encoder sensor is rotationally fixed relative to the rotary dial, and wherein the encoder sensor is configured to detect the plurality of position identification features as the rotary dial and encoder wheel rotate relative to the encoder sensor. Aspects of the above system include wherein the encoder wheel and the encoder sensor are disposed in the internal cavity of the rotary dial, and wherein an electrical lead for the encoder sensor passes through the lumen of the longitudinal support shaft. Aspects of the above system include wherein the longitudinal support shaft is axially supported by a linear bearing surrounding a portion of the longitudinal support shaft at a point between the first end of the longitudinal support shaft and the second end of the longitudinal support shaft. Aspects of the above system include wherein the second end of the rotary dial includes two radial ball bearing assemblies axially separated from one another by a separation distance, and wherein an inner race of each of the two radial ball bearing assemblies surrounds a periphery of the longitudinal support shaft. Aspects of the above system include wherein the user interface device further comprises a spring disposed between the linear bearing and the second end of the rotary dial, wherein the rotary dial is displaceable along the axis and against a compressive force of the spring. Aspects of the above system include wherein the touchpad and the longitudinal support shaft are displaceable along the axis in conjunction with a displacement of the rotary dial.

Embodiments include a jog dial user interface device, comprising: a longitudinal hollow shaft having a first end and a second end defining a dial axis; a multi-touch input touchpad rotationally fixed to the first end of the longitudinal hollow shaft; a jog dial including a substantially ring-shaped body that at least partially surrounds a periphery of the multi-touch input touchpad, the jog dial rotatable about the dial axis via two axially offset radial bearings connected between the jog dial and the longitudinal hollow shaft, wherein a portion of the multi-touch input touchpad is disposed inside the substantially ring-shaped body; an encoder wheel affixed to the jog dial, the encoder wheel including a plurality of position identification features disposed in a pattern around a periphery of the encoder wheel; and an encoder sensor operatively coupled to read the plurality of position identification features of the encoder wheel, wherein the encoder sensor is rotationally fixed relative to the jog dial, and wherein the encoder sensor is configured to detect the plurality of position identification features as the jog dial and encoder wheel rotate relative to the rotationally fixed encoder sensor.

Embodiments include a method of altering a display output based on a detected angular momentum of a free-spinning rotary dial input device, comprising: rendering, via a processor, visible objects in a first position in a display of a display device; determining, via the processor, a rotational input at the rotary dial input device over time; determining, via the processor, that the rotational input includes momentum movement characteristics indicating that a dial of the rotary dial input device is rotating without user contact over time; and moving, via the processor, a position of the visible objects rendered in the display dynamically from the first position to subsequent positions in the display at a changing rate of speed that mimics the rotational input and determined momentum movement characteristics of the dial over time.

Aspects of the above method include wherein prior to moving the position of the visible objects rendered in the display, the method further comprises: determining, via the processor, a type of the visible objects rendered in the display, wherein the subsequent positions of the visible objects rendered in the display are based on the type of the visible objects determined. Aspects of the above method include wherein the type of the visible objects is a list of objects, and wherein moving the position of the visible objects rendered in the display includes scrolling the list of objects at the changing rate of speed as the determined movement characteristics change over time. Aspects of the above method include wherein the determined movement characteristics include an angular velocity profile of the dial rotating over time. Aspects of the above method include wherein a shape of the angular velocity profile of the dial over time indicates that the dial is free-spinning and rotating without user contact. Aspects of the above method include wherein the rotary dial user input device includes a haptic device configured to provide physical feedback output corresponding to an indication of moving from one visible object to another visible object in the display. Aspects of the above method include wherein the physical feedback output is a vibration of the rotary dial user input device having a defined time of vibration. Aspects of the above method include wherein upon reaching an end of the list of objects, the method comprises ceasing the physical feedback output provided by the haptic device allowing the dial to rotate freely without any additional friction or braking. Aspects of the above method include wherein the defined time of vibration associated with the physical feedback output is associated with a size and/or a number of the visible objects in the list of objects. Aspects of the above method include wherein, when the list of objects includes a greater number of visible objects in the list of objects, the physical feedback output includes a shorter defined time of vibration than the defined time of vibration when the list of objects includes fewer visible objects in the list of objects.

Embodiments include a rotary dial input device, comprising: a dial with a specific mass that rotates about an axis; a processor; and a computer-readable storage device having instructions stored thereon that, when executed by the processor, cause the processor to: render visible objects in a first position in a display of a display device; determine a rotational input at the rotary dial input device over time; determine that the rotational input includes momentum movement characteristics indicating that a dial of the rotary dial input device is rotating without user contact over time; and move a position of the visible objects rendered in the display dynamically from the first position to subsequent positions in the display at a changing rate of speed that mimics the rotational input and determined momentum movement characteristics of the dial over time.

Aspects of the above device include wherein prior to moving the position of the visible objects rendered in the display, the instructions further cause the processor to: determine a type of the visible objects rendered in the display, wherein the subsequent positions of the visible objects rendered in the display are based on the type of the visible objects determined. Aspects of the above device include wherein the type of the visible objects is a list of objects, and wherein moving the position of the visible objects rendered in the display includes scrolling the list of objects at the changing rate of speed as the determined movement characteristics change over time. Aspects of the above device include wherein the determined movement characteristics include an angular velocity profile of the dial rotating over time. Aspects of the above device include wherein a shape of the angular velocity profile of the dial over time indicates that the dial is free-spinning and rotating without user contact. Aspects of the above device include wherein the rotary dial user input device includes a haptic device and wherein the instructions further cause the processor to: activate the haptic device to provide physical feedback output corresponding to an indication of moving from one visible object to another visible object in the display. Aspects of the above device include wherein the physical feedback output is a vibration of the dial of the rotary dial user input device, and wherein the physical feedback output includes a defined time of vibration. Aspects of the above device include wherein upon reaching an end of the list of objects, the instructions further cause the processor to deactivate the haptic device and cease the physical feedback output allowing the dial to rotate freely without any additional friction or braking. Aspects of the above device include wherein the defined time of vibration associated with the physical feedback output is associated with a size and/or a number of the visible objects in the list of objects, and wherein, when the list of objects includes a greater number of visible objects in the list of objects, the physical feedback output includes a shorter defined time of vibration than the defined time of vibration when the list of objects includes fewer visible objects in the list of objects.

Embodiments include a user interface system, comprising: a processor; a display device interconnected to the processor; a rotary user interface device interconnected to the processor and having a dial with a specific mass that rotates about an axis; and a computer-readable storage device having instructions stored thereon that, when executed by the processor, cause the processor to: render visible objects in a first position in a display area of the display device; determine a rotational input at the dial of the rotary user interface device over time; determine that the rotational input includes momentum movement characteristics indicating that the dial of the rotary user interface device is rotating without user contact over time; and move a position of the visible objects rendered in the display dynamically from the first position to subsequent positions in the display at a changing rate of speed that mimics the rotational input and determined momentum movement characteristics of the dial over time.

Any one or more of the aspects/embodiments as substantially disclosed herein.

Any one or more of the aspects/embodiments as substantially disclosed herein optionally in combination with any one or more other aspects/embodiments as substantially disclosed herein.

One or more means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

What is claimed is:

1. A method of altering a display output based on a detected angular momentum of a free-spinning rotary dial input device, comprising:
    rendering, via a processor, visible objects in a first position in a display of a display device;
    determining, via the processor, a rotational input at the free-spinning rotary dial input device over time;
    determining, via the processor, that the rotational input includes momentum movement characteristics indicating that a dial of the free-spinning rotary dial input device is rotating without user contact over time; and
    moving, via the processor while the dial is rotating without user contact, a position of the visible objects rendered in the display dynamically from the first position to subsequent positions in the display at a changing rate of speed that mimics the rotational input and determined momentum movement characteristics of the dial over time.

2. The method of claim 1, wherein prior to moving the position of the visible objects rendered in the display, the method further comprises:
    determining, via the processor, a type of the visible objects rendered in the display, wherein the subsequent positions of the visible objects rendered in the display are based on the type of the visible objects determined.

3. The method of claim 2, wherein the type of the visible objects is a list of objects, and wherein moving the position of the visible objects rendered in the display includes scrolling the list of objects at the changing rate of speed as the determined momentum movement characteristics change over time.

4. The method of claim 3, wherein the determined momentum movement characteristics include an angular velocity profile of the dial rotating over time.

5. The method of claim 4, wherein a shape of the angular velocity profile of the dial over time indicates that the dial is free-spinning and rotating without user contact.

6. The method of claim 5, wherein the free-spinning rotary dial user input device includes a haptic device configured to provide physical feedback output corresponding to an indication of moving from one visible object to another visible object in the display.

7. The method of claim 6, wherein the physical feedback output is a vibration of the free-spinning rotary dial user input device having a defined time of vibration.

8. The method of claim 7, wherein upon reaching an end of the list of objects, the method comprises ceasing the physical feedback output provided by the haptic device allowing the dial to rotate freely without applying any additional friction and without braking.

9. The method of claim 7, wherein the defined time of vibration associated with the physical feedback output is associated with a size and/or a number of the visible objects in the list of objects.

10. The method of claim 9, wherein, when the list of objects includes a greater number of visible objects in the list of objects, the physical feedback output includes a shorter defined time of vibration than the defined time of vibration when the list of objects includes fewer visible objects in the list of objects.

11. A rotary dial input device, comprising:
    a dial with a specific mass that rotates about an axis;
    a processor; and
    a computer-readable storage device having instructions stored thereon that, when executed by the processor, cause the processor to:
        render visible objects in a first position in a display of a display device;
        determine a rotational input at the rotary dial input device over time;
        determine that the rotational input includes momentum movement characteristics indicating that a dial of the rotary dial input device is rotating without user contact over time; and
        move, while the dial is rotating without user contact, a position of the visible objects rendered in the display dynamically from the first position to subsequent positions in the display at a changing rate of speed that mimics the rotational input and determined momentum movement characteristics of the dial over time.

12. The rotary dial input device of claim 11, wherein prior to moving the position of the visible objects rendered in the display, the instructions further cause the processor to:
    determine a type of the visible objects rendered in the display, wherein the subsequent positions of the visible objects rendered in the display are based on the type of the visible objects determined.

13. The rotary dial input device of claim 12, wherein the type of the visible objects is a list of objects, and wherein moving the position of the visible objects rendered in the display includes scrolling the list of objects at the changing rate of speed as the determined momentum movement characteristics change over time.

14. The rotary dial input device of claim 13, wherein the determined momentum movement characteristics include an angular velocity profile of the dial rotating over time.

15. The rotary dial input device of claim 14, wherein a shape of the angular velocity profile of the dial over time indicates that the dial is free-spinning and rotating without user contact.

16. The rotary dial input device of claim 15, wherein the free-spinning rotary dial user input device includes a haptic device and wherein the instructions further cause the processor to:
    activate the haptic device to provide physical feedback output corresponding to an indication of moving from one visible object to another visible object in the display.

17. The rotary dial input device of claim 16, wherein the physical feedback output is a vibration of the dial of the free-spinning rotary dial user input device, and wherein the physical feedback output includes a defined time of vibration.

18. The rotary dial input device of claim 17, wherein upon reaching an end of the list of objects, the instructions further cause the processor to deactivate the haptic device and cease the physical feedback output allowing the dial to rotate freely without applying any additional friction and without braking.

19. The rotary dial input device of claim 17, wherein the defined time of vibration associated with the physical feedback output is associated with a size and/or a number of the visible objects in the list of objects, and wherein, when the list of objects includes a greater number of visible objects in the list of objects, the physical feedback output includes a shorter defined time of vibration than the defined time of vibration when the list of objects includes fewer visible objects in the list of objects.

20. A user interface system, comprising:
    a processor;
    a display device interconnected to the processor;
    a rotary user interface device interconnected to the processor and comprising a haptic device and a dial with a specific mass that rotates about an axis; and
    a computer-readable storage device having instructions stored thereon that, when executed by the processor, cause the processor to:
        render a list of visible objects in a first position in a display area of the display device;
        determine a rotational input at the dial of the rotary user interface device over time;
        determine that the rotational input includes momentum movement characteristics indicating that the dial of the rotary user interface device is rotating without user contact over time;
        move, while the dial is continuing to rotate without user contact over time, a position of the list of visible objects rendered in the display device dynamically from the first position to subsequent positions in the display device by scrolling the list of visible objects at a changing rate of speed that mimics the rotational input and determined momentum movement characteristics of the dial over time;
        activate, while the dial is continuing to rotate without user contact over time, the haptic device providing a haptic vibration at the dial corresponding to an indication of moving from one visible object to another visible object in the list of visible objects rendered in the display device;
        determine, while the dial is continuing to rotate without user contact over time, an end of the list of visible objects rendered in the display device is reached; and
        deactivate, while the dial is continuing to rotate without user contact over time and in response to determining that the end of the list of visible objects rendered in the display device is reached, the haptic device ceasing the haptic vibration at the dial and allowing the dial to rotate freely without applying an additional friction and without braking.

* * * * *

UNITED STATES PATENT AND TRADEMARK OFFICE
CERTIFICATE OF CORRECTION

| | | |
|---|---|---|
| PATENT NO. | : 11,046,182 B2 | Page 1 of 1 |
| APPLICATION NO. | : 16/167003 | |
| DATED | : June 29, 2021 | |
| INVENTOR(S) | : James A. Chion et al. | |

It is certified that error appears in the above-identified patent and that said Letters Patent is hereby corrected as shown below:

In the Claims

Claim 20, Column 32, Line 37, delete "an" and insert --any-- therein.

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*